(12) United States Patent
Sakai et al.

(10) Patent No.: US 8,541,971 B2
(45) Date of Patent: Sep. 24, 2013

(54) DRIVING SYSTEM OF PERMANENT MAGNET SYNCHRONOUS MOTOR

(75) Inventors: Toshifumi Sakai, Hitachi (JP);
Yoshitaka Iwaji, Hitachinaka (JP);
Kiyoshi Sakamoto, Hitachinaka (JP);
Yoshiyuki Taguchi, Funabashi (JP);
Daigo Kaneko, Hitachi (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 404 days.

(21) Appl. No.: 12/805,840

(22) Filed: Aug. 20, 2010

(65) Prior Publication Data

US 2011/0050140 A1  Mar. 3, 2011

(30) Foreign Application Priority Data

Aug. 28, 2009  (JP) .................. 2009-197571

(51) Int. Cl.
*G05B 11/28* (2006.01)
(52) U.S. Cl.
USPC ...... 318/599; 318/801; 318/400.02; 318/721; 318/400.15; 363/40; 363/41; 363/42; 388/811; 388/819
(58) Field of Classification Search
USPC .............. 318/400.01, 400.02, 400.15, 400.32, 318/400.33, 599, 721, 727, 801, 811, 807, 318/808, 809, 812, 799, 700, 701; 363/40, 363/41, 42, 132; 388/811, 819
See application file for complete search history.

(56) References Cited

U.S. PATENT DOCUMENTS

| 6,121,736 | A | * | 9/2000 | Narazaki et al. | ......... 318/400.35 |
| 7,190,130 | B2 | * | 3/2007 | Wogari et al. | ............ 318/400.02 |
| 7,548,443 | B2 | * | 6/2009 | Arisawa et al. | ............... 363/132 |
| 2002/0060548 | A1 | | 5/2002 | Iwaji et al. | |
| 2006/0113948 | A1 | * | 6/2006 | Kaneko et al. | ................ 318/716 |

FOREIGN PATENT DOCUMENTS

| JP | 2004-345556 | 12/2004 |
| JP | 2006-158101 | 6/2006 |
| JP | 2007-060899 | 3/2007 |
| JP | 2007-174721 | 7/2007 |
| JP | 3979561 | 7/2007 |

* cited by examiner

*Primary Examiner* — Antony M Paul
(74) *Attorney, Agent, or Firm* — Antonelli, Terry, Stout & Kraus, LLP.

(57) ABSTRACT

When applying a high frequency voltage which alternates on positive and negative sides to a permanent magnet synchronous motor, a driving system of synchronous motor switches the applied voltage phase by 120 degrees successively and applies resultant voltages to three phases. A pulsating current generated by applying a high frequency voltage is detected at timing of elapse of a predetermined time $\Delta t$ since an output voltage of at least one phase has changed from a state in which all output voltages of the three phases of a power converter are positive or negative. Current detection is conducted by using a DC resistor or a phase current sensor provided on a DC bus. A magnetic pole estimation unit calculates the rotor magnetic pole position of the permanent magnet synchronous motor on the basis of differences between positive side and negative side change quantities in three-phase currents obtained from detected current values.

20 Claims, 31 Drawing Sheets

DRIVING SYSTEM OF PERMANENT MAGNET SYNCHRONOUS MOTOR

BACKGROUND OF THE INVENTION

The present invention relates to control of a synchronous motor which uses a permanent magnet in its field system. In particular, the present invention relates to a control apparatus and a control method which implement the control of the synchronous motor without using a sensor to detect the magnetic pole position of the rotor.

As techniques for controlling the synchronous motor without detecting the magnetic pole position of the rotor, there are techniques disclosed in JP-A-2006-158101 and JP-A-2007-174721.

According to the technique disclosed in JP-A-2006-158101, a minute changes is given to each of voltage commands on a dc axis which is an estimation magnetic pole axis of a synchronous motor and a qc axis perpendicular to the dc axis, and the magnetic pole position of the synchronous motor is directly estimated by utilizing a difference between a positive side current value and a negative side current value of a resultant current pulsating component appearing on a DC bus or a difference in current change rate of the current pulsating component between the positive side and the negative side.

The technique disclosed in JP-A-2006-158101 utilizes magnetic saturation characteristics of the iron core to estimate the magnetic pole position. It is now supposed that a high frequency alternating voltage is applied onto a d-axis which is the direction of the rotor magnetic flux (magnetic flux of a permanent magnet) in the synchronous motor. If a current flows in a direction which strengthens the magnet magnetic pole, then the magnetic flux saturates and the inductance decreases, and consequently the current change quantity ($\Delta I+$) becomes great. Conversely, if a current flows in a direction which weakens the magnet magnetic flux, then the magnetic flux decreases and the inductance increases or becomes constant, and consequently the current change quantity ($\Delta I-$) becomes less than $\Delta I+$ described above. If an alternating current which changes according to whether the polarity is positive or negative is injected onto the d-axis, therefore, a current in which a waveform on the positive side is asymmetric to that on the negative side flows.

According to the technique disclosed in JP-A-2006-158101, an alternating voltage is applied to two orthogonal phase angles and the above-described asymmetric current characteristics are observed from DC bus current detected values. Since the magnetic pole position of the rotor is not known, the alternating voltage is applied at an arbitrary phase angle. Asymmetric current characteristics caused at that time change depending upon the magnetic pole position of the rotor. In JP-A-2006-158101, it is supposed that the asymmetric current characteristics change according to a sin-function or a cos-function of the magnetic pole position of the rotor and the magnetic pole position of the rotor is calculated by using an arctangent function. According to the technique disclosed in JP-A-2006-158101, the magnetic pole position of the rotor can be estimated with a high precision without being affected by a difference in the structure of the synchronous motor such as the salient pole or the non-salient pole.

The technique disclosed in JP-A-2007-174721 also utilizes magnetic saturation characteristics of the iron core to estimate the magnetic pole position of the iron core. According to the technique disclosed in JP-A-2007-174721, a positive-negative alternating voltage is applied to each of three-phase rotor winding axes and a phase current on an axis with the alternating voltage applied thereto is detected. If positive phase current detected values corresponding to the three phases are obtained, then they are compared in magnitude to search for a phase current which assumes a maximum value and the magnetic pole position of the rotor is deduced with a resolution of 120 degrees. In addition, in order to make a decision as to a detailed magnetic pole position of the rotor, a current difference magnification $\alpha$, which will be described later, is calculated and compared with characteristic data (data representing a relation between the rotor position and the magnification $\alpha$) measured beforehand.

Recognizing the positive phase current detected values described above as maximum current, intermediate current and minimum current, it is disclosed that the magnification $\alpha$ is calculated by using Equation (1). According to the technique disclosed in JP-A-2007-174721, it is not necessary to prepare a large number of complicated computation expressions beforehand and the rotor position can be estimated easily with high precision.

$$\text{Magnification } \alpha = |\text{maximum current} - \text{intermediate current}|/|\text{intermediate current} - \text{minimum current}| \quad (1)$$

SUMMARY OF THE INVENTION

According to the technique disclosed in JP-A-2006-158101, alternating voltage commands having the same amplitude value are generated for the two orthogonal axes (the dc axis which is the estimation axis of the magnetic flux within the synchronous motor and the qc axis which is perpendicular to the dc axis). Even if the alternating voltage command values on the dc axis and on the qc axis have the same amplitude, however, pulse voltages of respective phases greatly differ when observed as three-phase voltage pulses after being pulse-width modulated. As a result, magnitudes of voltages applied to stator windings of u, v and w phases change, and influence of magnetic saturation depending upon the magnitude of the applied voltage appears in the detected current of each phase. Therefore, the magnetic pole position estimation technique disclosed in JP-A-2006-158101 has a problem that the position estimation error becomes great because three-phase currents detected from the shunt resistor at the time of application to the two orthogonal axes do not have magnetic saturation characteristics of the same condition.

In JP-A-2006-158101, sample timing of shunt current detection provided on a DC bus is disclosed. In the disclosed method, the V-phase current (or the W-phase current) which can be detected when the qc-axis voltage is applied is not both the positive-side peak and the negative-side peak value but only one of them because of restrictions of the shunt current detection provided on the DC bus. In addition, in JP-A-2006-158101, the current change quantity at the time of qc-axis voltage application is calculated. However, the calculation method holds good on the supposition that the influence of magnetic saturation of the V-phase is equal to that of the W-phase. As a matter of fact, the V-phase is different from the W-phase in the number of interlinkage magnetic fluxes, and consequently influences of magnetic saturation are not equal and the disclosed current change quantity calculation method is not accurate. As a result of them, estimation of the magnetic pole position of the synchronous motor according to the method disclosed in JP-A-2006-158101 brings about a problem that the estimation error becomes great.

According to the method disclosed in JP-A-2007-174721, a decision is made as to the detailed rotor position by referring to current characteristic data under magnetic saturation. Therefore, it is necessary to grasp the current characteristics of the driven motor beforehand. If the driven motor is changed, the current characteristics change. On all such occasions, therefore, it is considered to become necessary to look over the amplitude of the applied alternating voltage and a determinant value used to make a decision as to the rotor position again, and time is needed for adjustment work.

For improving the position estimation precision in the method disclosed in JP-A-2007-174721, it is necessary to increase the number of determinant values obtained by referring to the magnification α and the current characteristics. Increasing the number of determinant values is equivalent to making the decision range finer, and it is considered that false decisions become apt to occur in the magnetic pole discrimination due to the influence of noise or the like. For reducing false decisions, it becomes necessary to apply a high voltage to cause stronger magnetic saturation and increase the motor current to widen intervals between determinant value boundaries. As a result, however, there is a problem that noise caused by the motor becomes great.

In view of the problems, an object of the present invention is to provide a power converter control method and a current detection unit which make the magnetic saturation condition equal for three-phase detected current values utilized for the position estimation computation.

Another object of the present invention is to provide a control apparatus and a control method of a synchronous motor which makes it possible to estimate magnetic pole positions with high precision on the basis of three-phase detected currents without requiring adjustment work such as grasp current characteristics of the driven motor beforehand and studying the determinant values.

In a driving system of synchronous motor according to the present invention, voltage application conditions of respective phases are made equal for detected current values of three phases utilized for position estimation computation in order to achieve the objects. When applying a high frequency voltage which alternates in positive and negative values, therefore, the applied voltage phase is changed over successively by 120 degrees and applied to three phases. A positive side current value and a negative side current value of a phase current caused by application of each high frequency voltage are detected from a DC bus current. Deviation quantities of the positive side current value and the negative side current value of each of the three phases are calculated. The deviation quantities corresponding to the three phases are coordinate transformed to two orthogonal axes. The magnetic pole position of the rotor is calculated by using arctangent.

Specifically, in order to achieve the object, the present invention provides a synchronous motor driving system including a synchronous motor, a PWM signal controller for conducting pulse width modulation on three-phase voltage command signals by using a carrier signal, and a power converter driven by a gate signal subjected to pulse width modulation, the synchronous motor driving system including: a command voltage generation unit for generating three-phase voltage command signals to apply a high frequency voltage to the synchronous motor; a current detection unit for detecting a current which flows through the synchronous motor when the high frequency voltage is applied to the synchronous motor; and a magnetic pole position estimation unit for estimating a magnetic pole position of the synchronous motor on the basis of a result of the current detection, the command voltage generation unit generating the three-phase voltage command signals by conducting successive switching among a first applied voltage mode for applying a positive-negative alternating high frequency voltage having arbitrary voltage amplitude to an arbitrary phase θ, a second applied voltage mode for applying a high frequency voltage having similar amplitude to a phase shifted in electric angle from the phase θ by 120 degrees, and a third applied voltage mode for applying a high frequency voltage having similar amplitude to a phase shifted in electric angle from the phase θ by 240 degrees, the current detection unit detecting positive side values and negative side values of a pulsating current generated by applying the high frequency voltage in the first, second and third applied voltage modes at a rate of one phase in each of the modes, and obtaining information of a positive side U-phase detected current value, a negative side U-phase detected current value, a positive side V-phase detected current value, a negative side V-phase detected current value, a positive side W-phase detected current value, and a negative side V-phase detected current value, and the magnetic pole position estimation unit calculating an estimated magnetic pole position of the synchronous motor by using detected current values of respective phases of the positive side and detected current values of respective phases of the negative side.

In the synchronous motor driving system according to the present invention, the command voltage generation unit regards a winding axis direction of an arbitrary phase in three-phase stator windings of the synchronous motor as a reference phase and regards the reference phase as the phase θ=0.

In the synchronous motor driving system according to the present invention, each of the three-phase voltage command signals generated by the command voltage generation unit is formed by repeating a minimum pattern of applied voltage which has the carrier signal of the PWM signal controller corresponding to two periods as one unit, at least once.

In the synchronous motor driving system according to the present invention, the minimum pattern is formed by keeping a voltage command of at least one phase among the three-phase voltage commands at a positive voltage over a half period of the carrier signal and keeping voltage commands of remaining phases at a negative voltage, inverting all polarities of the three-phase voltage commands over one subsequent period of the carrier signal, and inverting all polarities of the three-phase voltage commands again over a subsequent half period of the carrier signal.

In the synchronous motor driving system according to the present invention, prior to canceling an all-phase off state of the gate signal and applying a high frequency voltage, the command voltage generation unit outputs special three-phase voltage commands to provide a time period during which all lower arm switch elements of the power converter are turned on.

In the synchronous motor driving system according to the present invention, when switching the applied voltage modes successively, the command voltage generation unit provides a time period during which all of the three-phase voltage commands are set to zero and application of the high frequency voltage is suspended.

In the synchronous motor driving system according to the present invention, an averaging processing unit for conducting averaging processing on current values detected at least one point in each of the first, second and third applied voltage modes, every detection point in each mode is further included, and an estimated magnetic pole position of the synchronous motor is calculated by using a detected current average value of the positive side at every phase and every detection point and a detected current average value of the negative side at every phase and every detection point.

In the synchronous motor driving system according to the present invention, the detected current average value is calculated by using detected current values obtained when a predetermined time has elapsed since application of the high frequency voltage is started in the first, second and third applied voltage modes.

In the synchronous motor driving system according to the present invention, the current detection unit detects a DC bus current in the power converter.

In the synchronous motor driving system according to the present invention, the current detection unit detects a DC bus current at timing of elapse of a predetermined time Δt since an output voltage of at least one phase has changed from a state in which all output voltages of the three phases of the power converter are positive or negative.

In the synchronous motor driving system according to the present invention, the current detection unit detects a DC bus current at timing of elapse of a predetermined time Δt since an output voltage of at least one phase has changed from a state in which all output voltages of the three phases of the power converter are positive or negative and at timing of elapse of a predetermined time Kt×Δt (where Kt is a positive fixed value of 1 or less) since an output voltage of at least one phase has changed from a state in which all output voltages of the three phases of the power converter are positive or negative In the synchronous motor driving system according to the present invention, the current detection unit detects a DC bus current in vicinity of timing of transition to a state in which all output voltages of the three phases of the power converter are positive (maximum values) or negative (negative values).

In the synchronous motor driving system according to the present invention, the current detection unit detects a DC bus current in vicinity of timing of change of an output voltage of at least one phase from a state in which all output voltages of the three phases of the power converter are positive (maximum values) or negative (negative values) and in vicinity of timing of transition to a state in which all output voltages of three phases of the power converter are positive (maximum values) or negative (negative values).

In the synchronous motor driving system according to the present invention, the current detection unit detects phase currents of at least two phases.

In the synchronous motor driving system according to the present invention, the current detection unit detects phase currents at timing of a wave crest or a wave bottom of the carrier signal in the PWM signal controller.

In the synchronous motor driving system according to the present invention, the current detection unit detects phase currents at timing of a wave crest and a wave bottom of the carrier signal in the PWM signal controller.

In the synchronous motor driving system according to the present invention, the magnetic pole position estimation unit finds a deviation quantity between a positive side detected current value and a negative side detected current value every phase, conducts coordinate transformation to two orthogonal axes on the obtained deviation quantities corresponding to the three phases, and calculates the estimated magnetic pole position of the synchronous motor from the quantities on the two orthogonal axes by using arctangent.

In the synchronous motor driving system according to the present invention, the magnetic pole position estimation unit finds a positive side current change quantity and a negative side current change quantity from the detected current values every phase, finds a deviation quantity between the positive side current change quantity and the negative side current change quantity every phase, conducts coordinate transformation to two orthogonal axes on the obtained deviation quantities corresponding to the three phases, and calculates the estimated magnetic pole position of the synchronous motor from the quantities on the two orthogonal axes by using arctangent.

In the synchronous motor driving system according to the present invention, an evaluation unit for calculating a predetermined evaluated value on the basis of the magnetic pole position estimation result of the synchronous motor, and a unit for varying amplitude of a high frequency voltage supplied to the synchronous motor are further included, and the amplitude of the high frequency voltage is increased or decreased for automatic adjustment on the basis of the evaluated value.

In the synchronous motor driving system according to the present invention, the evaluated value is obtained by conducting the initial position estimation a number of times which is at least twice, calculating a maximum value and a minimum value on the basis of results of the initial position estimation conducted the number of times, and setting the evaluated value equal to a deviation quantity between the maximum value and the minimum value.

The present invention brings about an effect of improving the estimation precision by extracting current characteristics depending upon permanent magnet magnetic pole positions which bring about the same amplitude and conducting initial position estimation, in each of the three phases. Owing to this precision improvement, the present invention brings about an effect of improving the start torque of the driven motor.

Furthermore, since current characteristics of magnetic saturation of the iron core using the permanent magnet are utilized in the initial position estimation more strictly as compared with the conventional method, the lowest motor current required to satisfy the required value of estimation precision can be further decreased. As a result, noise caused by a pulsating current at the time of initial position estimation can be reduced, resulting in an effect of quietness.

Other objects, features and advantages of the invention will become apparent from the following description of the embodiments of the invention taken in conjunction with the accompanying drawings.

DESCRIPTION OF THE EMBODIMENTS

Hereafter, embodiments of the present invention will be described in detail with reference to the drawings. In principle, the same element is denoted by like character throughout all drawings.

Figure 1:
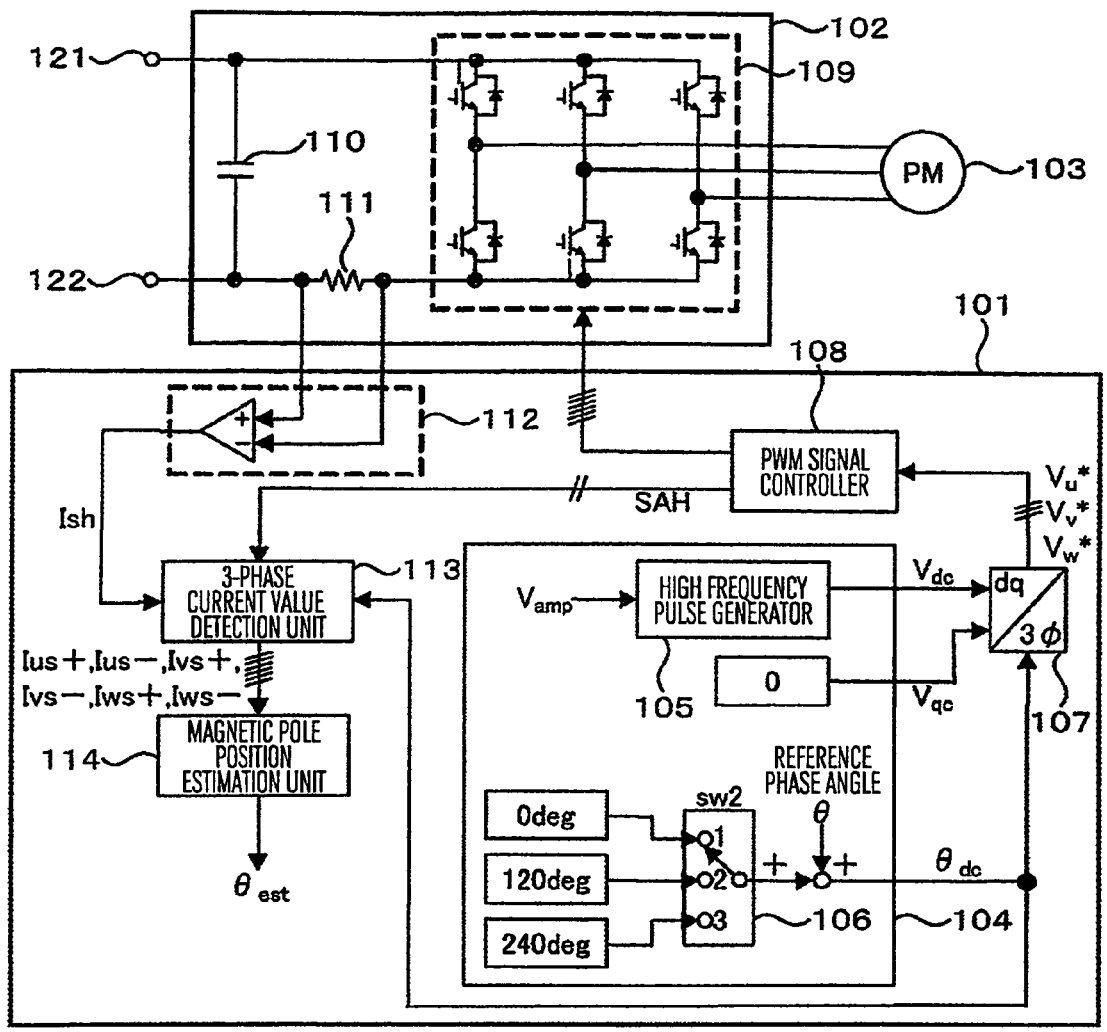
FIG. 1 is a general control block diagram in a first embodiment of the present invention.

FIG. 1 is a configuration diagram of a driving system of permanent magnet synchronous motor according to a first embodiment of the present invention. The driving system includes a permanent magnet synchronous motor 103 to be controlled, a power converter 102 for driving the permanent magnet synchronous motor 103, and a control apparatus 101 for controlling the power converter 102 and the permanent magnet synchronous motor 103. The control apparatus 101 includes a unit having a dc axis which is a phase axis for applying a high frequency voltage to the permanent magnet synchronous motor 103 and a qc axis perpendicular to the dc axis and providing a voltage command value of a high frequency component on the dc- and qc-axes, and a unit for detecting a current which flows through a DC resistor 111 in the power converter 102. The control apparatus 101 estimates a magnetic pole position in the permanent magnet synchronous motor 103 on the basis of a difference between a positive side change quantity and a negative side change quantity of a phase current value obtained from a pulsating component, for the pulsating component contained in a detected value of the current.

The configuration diagram shown in FIG. 1 will be described in more detail. In FIG. 1, a command voltage generation unit 104 outputs a voltage command Vdc, a voltage command Vqc, and an electric phase angle θdc. The voltage command Vdc is output from a high frequency pulse generator 105. On the other hand, value 0 is set for the voltage command Vqc. A voltage amplitude command signal Vamp is input to the high frequency pulse generator 105, and the high frequency pulse generator 105 outputs a square wave signal having amplitude of Vamp. The electric phase angle θdc is a signal obtained by adding an output value of a switcher 106 to a reference phase angle θ (fixed value). As for the output of the switcher 106, 0 degree, 120 degrees or 240 degrees is selected. The voltage command Vdc and the voltage command Vqc are transformed to voltage commands Vu*, Vv* and Vw* on three-phase AC axes by a dq coordinate inverse transformer 107 on the basis of the electric phase angle θdc. The voltage commands Vu*, Vv* and Vw* are transformed to a PWM pulse signal for driving the power converter 102 by a pulse width modulation (PWM) signal controller 108. Switch elements included in a main circuit unit 109 in the power converter 102 are controlled to turn on or off in response to the PWM pulse signal supplied from the PWM signal controller 108. As a result of controlling the switch elements, a voltage for driving the permanent magnet synchronous motor 103 is output to AC terminals of the power converter 102. The power converter 102 includes the main circuit unit 109, a DC power supply unit 110, input terminals 121 and 122 supplied with AC or DC power for driving the permanent magnet synchronous motor 103, and the DC resistor 111 for current detection. A voltage across the DC resistor 111 is amplified by an amplifier 112 and output as a detected current signal Ish of the DC unit current. A three-phase current value detection unit 113 outputs positive-side detected values of three-phase current values and negative-side detected values of the three-phase current values by using the detected current signal Ish, a current detection timing setting signal SAH which is output by the PWM signal controller 108, and the electric phase angle θdc. Values which are output by the three-phase current value detection unit 113 are a U-phase positive-side detected value Ius+, a U-phase negative-side detected value Ius−, a V-phase positive-side detected value Ivs+, a V-phase negative-side detected value Ivs−, a W-phase positive-side detected value Iws+, and a W-phase negative-side detected value Iws−. By the way, the current detection timing setting signal SAH is a compound signal, and it is formed of a trigger signal TRG which determines detection timing of the detected current signal Ish and an STS signal which indicates the state of the applied high frequency pulse signal. A magnetic pole position estimation unit 114 calculates an estimated magnetic pole position of the permanent magnet synchronous motor 103 by using Ius+, Ius−, Ivs+, Ivs−, Iws+ and Iws− which are output by the three-phase current value detection unit 113, and outputs the estimated magnetic pole position as θest.

Operation of the initial magnetic pole position estimation in the present embodiment will now be described.

Figure 2:
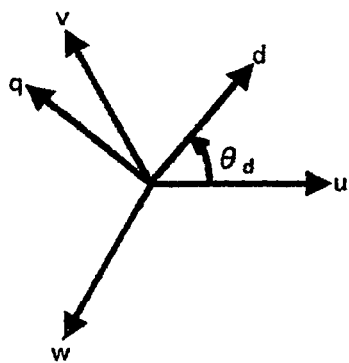
FIG. 2 is a diagram showing relations between three-phase stator winding axes and a rotor magnetic pole position of a permanent magnet synchronous motor.
Figure 3:
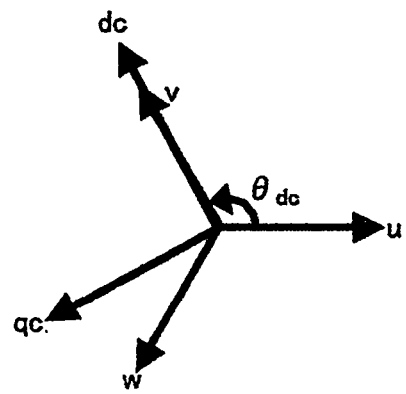
FIG. 3 is a diagram showing relations between three-phase stator winding axes and phase axes on which a high frequency voltage is applied to a permanent magnet synchronous motor.

First, coordinate axes will be defined with reference to FIGS. 2 and 3. In the present embodiment, the U-phase of the three-phase stator windings in the permanent magnet synchronous motor 103 is defined as u axis, the V-phase is defined as v axis, and the W-phase is defined as w axis. Furthermore, the rotor magnetic flux direction of the permanent magnet synchronous motor 103 is defined as d axis, and an axis perpendicular to the d axis is defined as q axis. The electric phase angle of the d axis is defined as a phase angle θd viewed from the u axis of the stator in FIG. 2. When θd is 0 degree, interlinkage magnetic flux of the U-phase winding is maximized.

The dc axis and qc axis used to generate the output voltage of the power converter 102 will now be defined with reference to FIG. 3. The dc axis shown in FIG. 3 is an axis of a phase at which a high frequency voltage is applied to the permanent magnet synchronous motor 103, and the qc axis is an axis perpendicular to the dc axis. The electric phase angle θdc on the dc axis is defined as a phase angle θd viewed from the u axis of the stator in FIG. 3.

In the present embodiment, the electric phase angle θd (initial magnetic pole position) on the d axis is estimated in the state in which the rotor of the permanent magnet synchronous motor 103 stops, and the estimated electric phase angle θd (initial magnetic pole position) is output as an estimated magnetic pole position θest.

Figure 4:
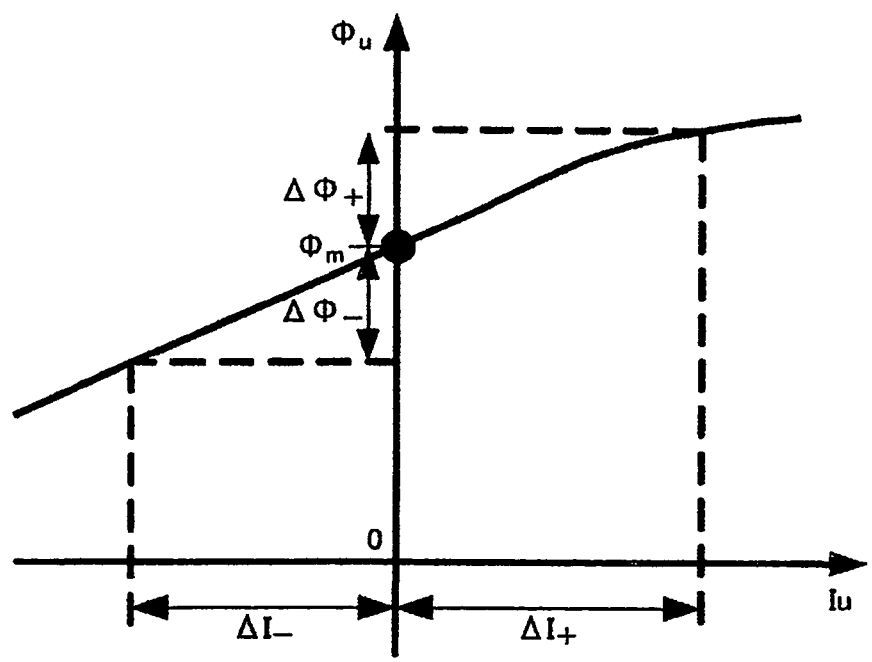
FIG. 4 is a diagram showing a relation between a synthetic magnetic flux Φu and a U-phase current Iu obtained when the d-axis coincides with the u-axis.
Figure 5:
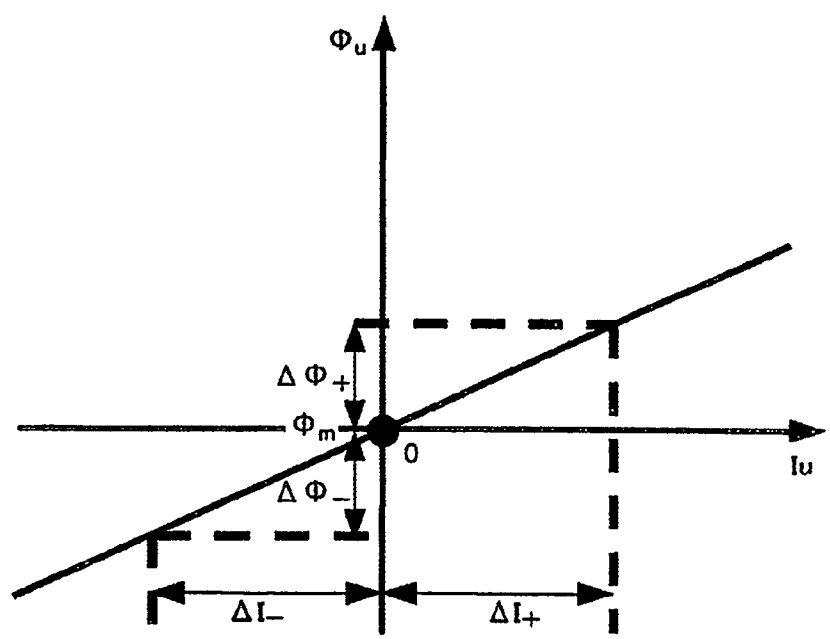
FIG. 5 is a diagram showing a relation between a synthetic magnetic flux Φu and a U-phase current Iu obtained when the d-axis is perpendicular to the u-axis.

According to the present invention, magnetic saturation characteristics of the iron core cause by the permanent magnet are utilized to estimate the initial magnetic pole position of the permanent magnet synchronous motor. The principle of estimation will now be described briefly. FIGS. 4 and 5 show relations between the U-phase current Iu obtained when a positive-negative alternating voltage is applied to the U-phase stator winding axis and a synthetic magnetic flux Φu in the u axis direction. FIG. 4 shows the relation obtained when the rotor magnetic flux direction (d axis) coincides with the u axis which is the U-phase stator winding axis. FIG. 5 shows the relation obtained when the rotor magnetic flux direction (d axis) is perpendicular to the u axis which is the U-phase stator winding axis. If a positive-negative alternating voltage is injected onto the u axis in the case of FIG. 4, then a positive-negative asymmetric current flows. Its cause will now be described. If the electric phase angle on the d axis θd=0 degree, magnetic flux Φm is formed in the iron core on the u axis by the permanent magnet. If a current flows in a direction which strengthens the magnetic flux of the magnet, the synthetic magnetic flux Φu on the u axis is saturated and inductance decreases. As a result, the positive-side current change ΔIu+ becomes great. That is the cause. On the other hand, if a current flows in a direction which weakens the magnetic flux Φm of the magnet, the synthetic magnetic flux Φu decreases and the inductance increases (or the inductance becomes constant). As a result, the negative side current change ΔIu− becomes small. In the case where θd=90 degrees shown in FIG. 5, the u axis is perpendicular to the rotor magnetic flux direction. As a result, the magnetic flux in the iron core on the u axis caused by the permanent magnet becomes Φm=0, and a current generated by injecting a positive-negative alternating voltage on the u axis becomes positive-negative symmetrical.

Figure 6:
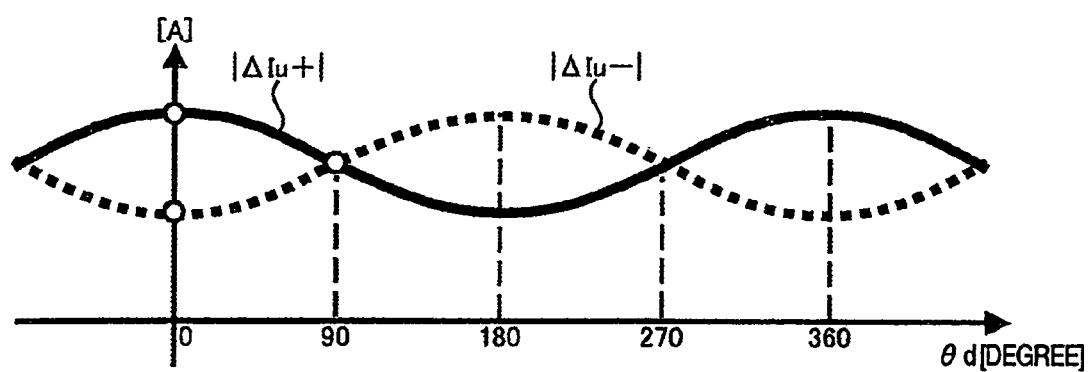
FIG. 6 is a diagram showing relations between positive-side and negative-side current change quantities and the rotor magnetic pole position obtained when a high frequency voltage is applied to the u-axis.

It is considered that the "positive-negative asymmetry" of the current described above continuously changes depending upon θd when the rotor magnetic pole position θd is in an arbitrary phase. When a positive-negative alternating voltage is applied to the U-phase stator winding axis, an absolute value |ΔIu+| of a U-phase current value caused by application of a positive-side voltage and an absolute value |ΔIu−| of a U-phase current value caused by application of a negative-side voltage changes with θd as shown in FIG. 6, considering the "positive-negative symmetry" of the current caused by magnetic saturation in the iron core. It is now supposed that the rotor magnetic flux direction (d axis) coincides with the u axis (θd=0 degree) as shown in FIG. 4. If in this case a pulse voltage is applied to the positive side, then a current flows in a direction which strengthens the magnetic flux of the magnet and consequently |ΔIu+| is maximized under the influence of the above-described magnetic saturation of the iron core. If a pulse voltage is applied to the negative side, then a current flows in a direction which weakens the magnetic flux of the magnet and consequently |ΔIu−| is minimized. In the case where the rotor magnetic flux direction (d axis) is perpendicular to the u axis (θd=90 degrees) as shown in FIG. 5, |ΔIu+| obtained when a pulse voltage is applied to the positive side and |ΔIu−| obtained when a pulse voltage is applied to the negative side assume the same value, because neither of them is influenced by the interlinkage magnetic flux generated by the permanent magnet. In the application of the alternating voltage to the u axis, each of the detected U-phase current values |ΔIu+| and |ΔIu−| becomes a value depending upon the rotor magnetic pole position θd as shown in FIG. 6.

In order to use the current change having the rotor position dependence as shown in FIG. 6 in estimation of the initial position, a deviation quantity ΔPu between detected currents |ΔIu+| and |ΔIu−| obtained when the positive-negative alternating voltage is applied to the u axis is calculated according to Equation (2).

$$\Delta Pu = |\Delta Iu+| - |\Delta Iu-| \tag{2}$$

Figure 7:
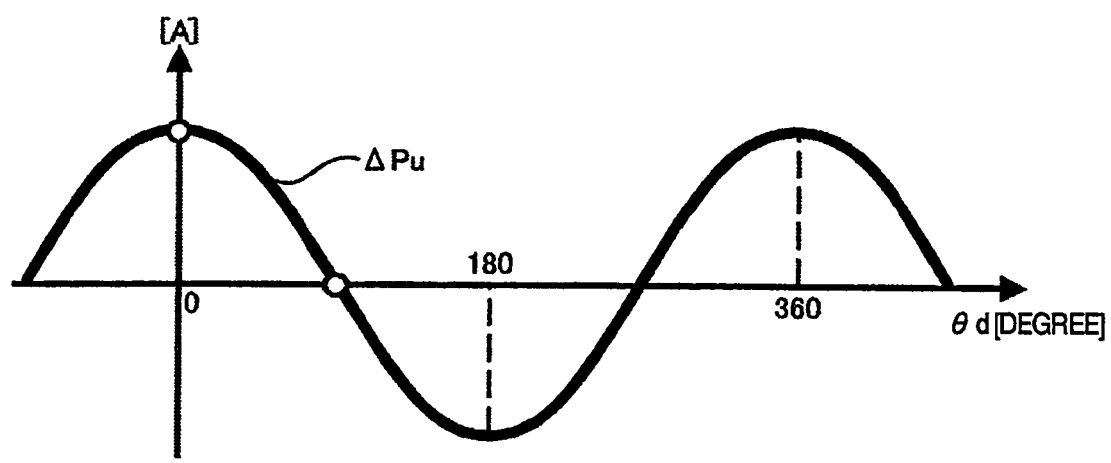
FIG. 7 is a diagram showing a relation between the positive side-negative side current change deviation quantity ΔPu and the rotor magnetic pole position obtained when a high frequency voltage is applied to the u-axis.

When the rotor magnetic flux direction (the d axis) coincides with the u axis (when θd=0 degree) as shown in FIG. 4, the difference of influence exerted upon the magnetic saturation of the iron core by the permanent magnet is maximized and the deviation quantity ΔPu assumes the greatest value on the positive side as shown in FIG. 7. When the rotor magnetic flux direction (the d axis) is perpendicular to the u axis (when θd=90 degrees) as shown in FIG. 5, the influence exerted upon the magnetic saturation of the iron core by the permanent magnet is not present, and consequently |ΔIu+| and |ΔIu−| assume the same value and the deviation quantity ΔPu becomes zero. When the positive-negative alternating voltage is applied to the U-phase stator winding axis, therefore, the deviation quantity ΔPu obtained by continuously changing the rotor magnetic pole position θd becomes a cosine function of θd.

For estimating the initial magnetic pole position by utilizing the characteristics in which the deviation quantity ΔPu becomes the cosine function of θd, it is necessary to calculate a component depending upon a sine function of θd besides the cosine function of θd. In the present invention, a positive-negative alternating voltage is applied to each of the v axis and the w axis as well to calculate differences ΔPv and ΔPw between the positive-side change quantity and the negative-side change quantity in the same way as the above-described case where the positive-negative alternating voltage is applied to the U-phase stator winding axis. A component depending upon the sine function of θd and a component depending upon the cosine function of θd are calculated by applying coordinate transformation of current characteristics ΔPu, ΔPv and ΔPw on the three-phase fixed axes to two orthogonal axes.

A method for generating a concrete voltage command to calculate the cosine function and the sine function depending upon θd in the initial magnetic pole position estimation according to the present embodiment will now be described.

Figure 8:
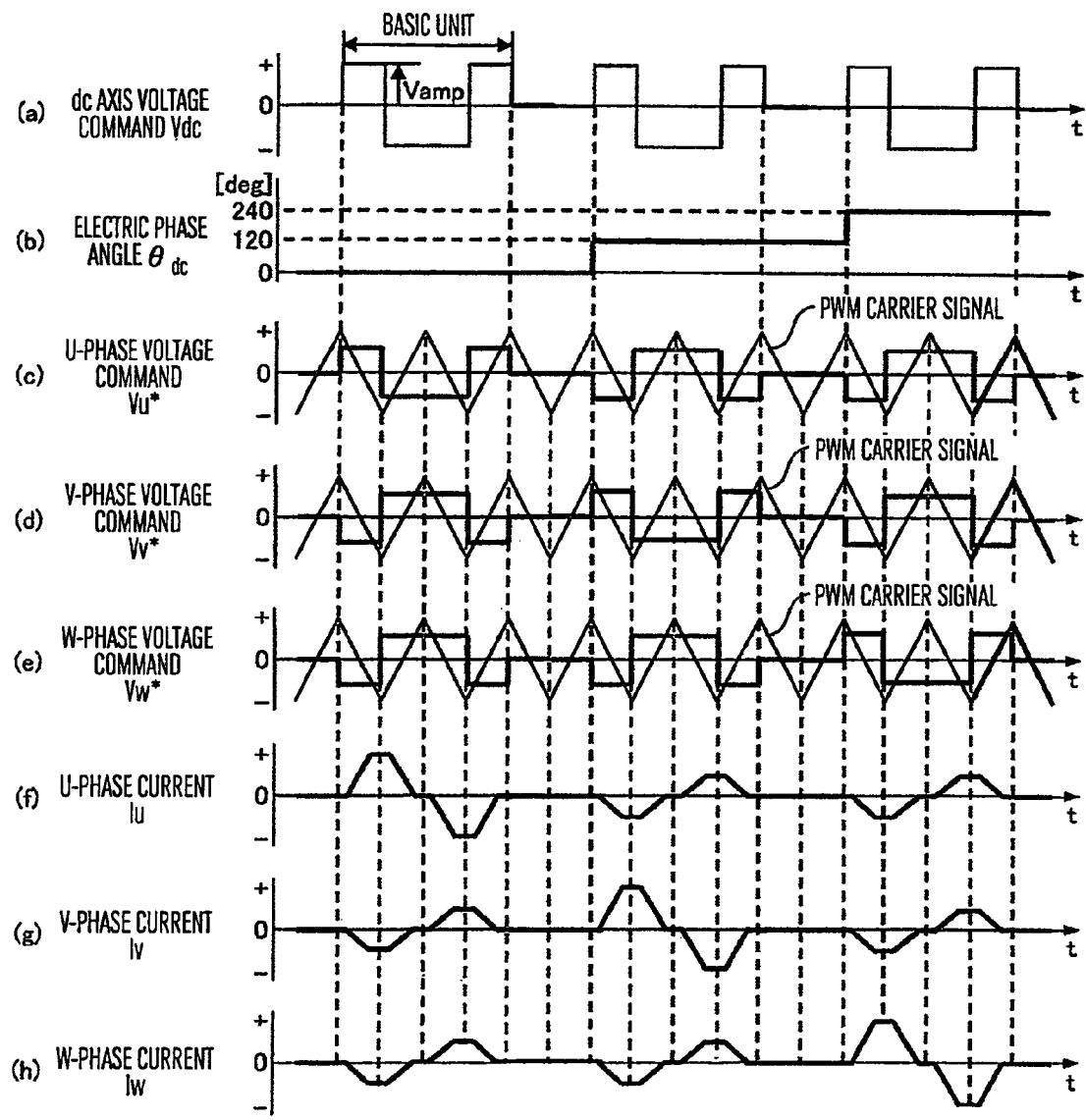
FIG. 8 is an operation waveform diagram obtained when a high frequency voltage is applied successively to three-phase stator windings in the first embodiment of the present invention.

FIG. 8 shows relations among applied voltage commands and currents at the time of magnetic pole position estimation. FIG. 8(a) shows a signal waveform of a dc axis voltage command Vdc. The Vdc is a square wave signal (where voltage amplitude of a square wave is Vamp) which is output from the high frequency pulse generator 105. The square wave signal changes in synchronism with a PWM carrier signal used for comparison in the pulse width modulation signal controller 108. As shown in FIG. 8(a), Vdc becomes a positive voltage (+Vamp) over a half period of the PWM carrier signal, becomes a negative voltage (−Vamp) over the next one period of the PWM carrier signal, and becomes a positive voltage (+Vamp) again over the final half period of the PWM carrier signal. In the present invention, a series of changes of the square wave signal (changes in a part indicated by arrows in FIG. 8(a)) is regarded as a basic unit of the high frequency applied voltage. FIG. 8(b) shows a change of an electric phase angle θdc. The value of the electric phase angle θdc is switched to 0 degree, 120 degrees, and 240 degrees, successively. The voltage commands Vdc and Vqc and θdc are transformed to three-phase voltage commands Vu*, Vv* and Vw* by the dq coordinate inverse transformer 107. Equations for the transformation are indicated by Equations (3) to (5). Here, Equations obtained when Vqc=0 is given are indicated.

First, Vu', Vv' and Vw' are calculated by using Equation (3).

$$\begin{cases} Vu' = Vdc \times \cos\left(\frac{\theta dc}{360} \times 2\pi\right) \\ Vv' = Vdc \times \cos\left(\frac{\theta dc}{360} \times 2\pi - \frac{2}{3}\pi\right) \\ Vw' = Vdc \times \cos\left(\frac{\theta dc}{360} \times 2\pi - \frac{4}{3}\pi\right) \end{cases} \tag{3}$$

Then, the three-phase voltage commands Vu*, Vv* and Vw* are found by using Equation (4).

$$\begin{cases} Vu^* = Vu' + \Delta V \\ Vv^* = Vv' + \Delta V \\ Vw^* = Vw' + \Delta V \end{cases} \tag{4}$$

Here, ΔV is an addition voltage of zero phase. As an example of calculation of ΔV, Equation (5) is shown.

$$\Delta V = -\frac{1}{2}(V_{max} + V_{min}) \tag{5}$$

Here, $$\begin{cases} V_{max} = \max\{Vu', Vv', Vw'\} \\ V_{min} = \min\{Vu', Vv', Vw'\} \end{cases}$$

The three-phase voltage commands Vu*, Vv* and Vw* obtained in this way are compared with the PWM carrier signal. In FIG. 8, (c), (d) and (e) show relations between the three-phase voltage commands and the PWM carrier signal. The PWM pulse signal subjected to the pulse width modulation is supplied to the power converter 102, and currents in the permanent magnet synchronous motor 103 change. In FIG. 8, (c), (d) and (e) show phase currents Iu, Iv and Iw of the permanent magnet synchronous motor 103.

As shown in (a) of FIG. 8, the square wave signal is output from the high frequency pulse generator 105 as the dc axis voltage command Vdc. In each of phases, an output voltage in which the voltage application time on the positive side is equal to that on the negative side can be generated. As shown in (f), (g) and (h) of FIG. 8, currents can be let flow on the positive side and the negative side of the phase currents Iu, Iv and Iw. The reason why the electric phase angle θdc is switched to 0 degree, 120 degrees and 240 degrees successively as shown in (b) of FIG. 8 is that the voltage application condition should be made equal in respective phases.

Figure 9:
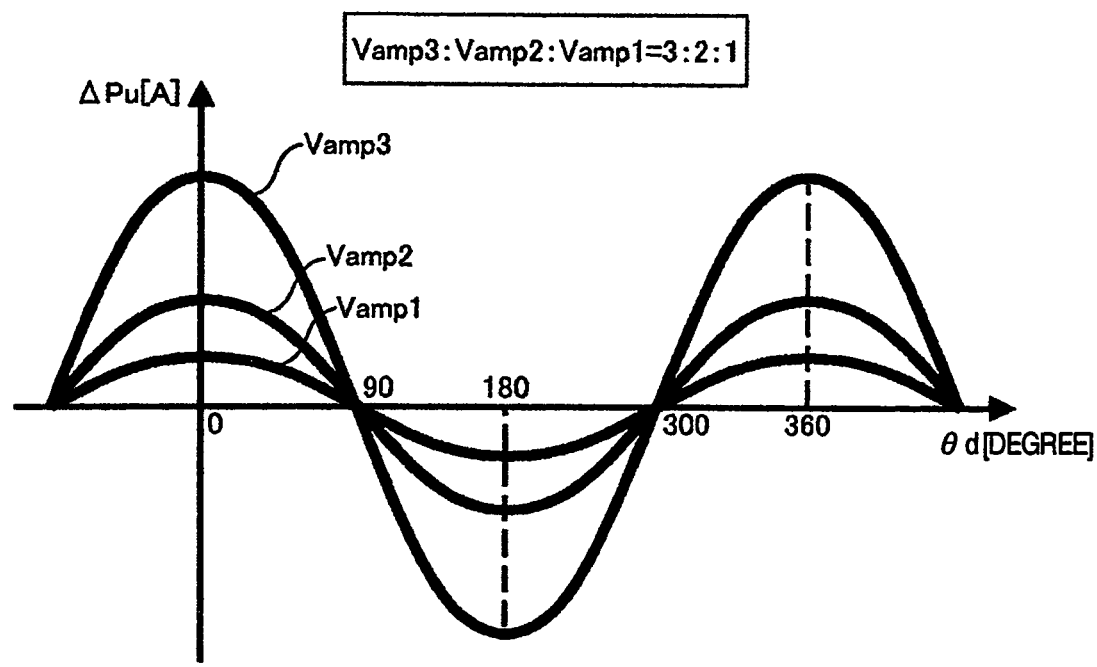
FIG. 9 is a diagram showing relations between voltage amplitude commands Vamp and a deviation quantity ΔPu of current pulsating component.

The necessity that the voltage application condition should be made equal in respective phases and peak values of characteristics of "positive-negative asymmetry" in current change should be aligned will now be described. Nonlinear characteristics caused in the generated pulsating current by magnetic saturation as compared with the magnitude of the applied positive-negative alternating voltage relate to this. FIG. 9 shows a change of a deviation quantity ΔPu of "positive-negative asymmetry" of the current caused by magnetic saturation of the iron core when the voltage amplitude command Vamp is changed. If Vamp is changed from Vamp1 to Vamp2, then to Vamp3, changes of ΔPu with the rotor magnetic pole position θd caused by application of respective voltages produce waveforms which are similar in magnetic pole position dependence and which are different only in the amplitude magnitude. Whereas the ratio in applied voltage magnitude among Vamp1, Vamp2 and Vamp3 is 1:2:3, the amplitude magnitude of the characteristic ΔPu increases nonlinearly in FIG. 9. Because of this nonlinear characteristic, the peak value of the characteristic of the "positive-negative asymmetry" of the current caused by the magnetic saturation and obtained from the detected current differs depending upon the way of giving the three-phase voltage command at the time of the initial position estimation, resulting in a position estimation error.

Figure 10:
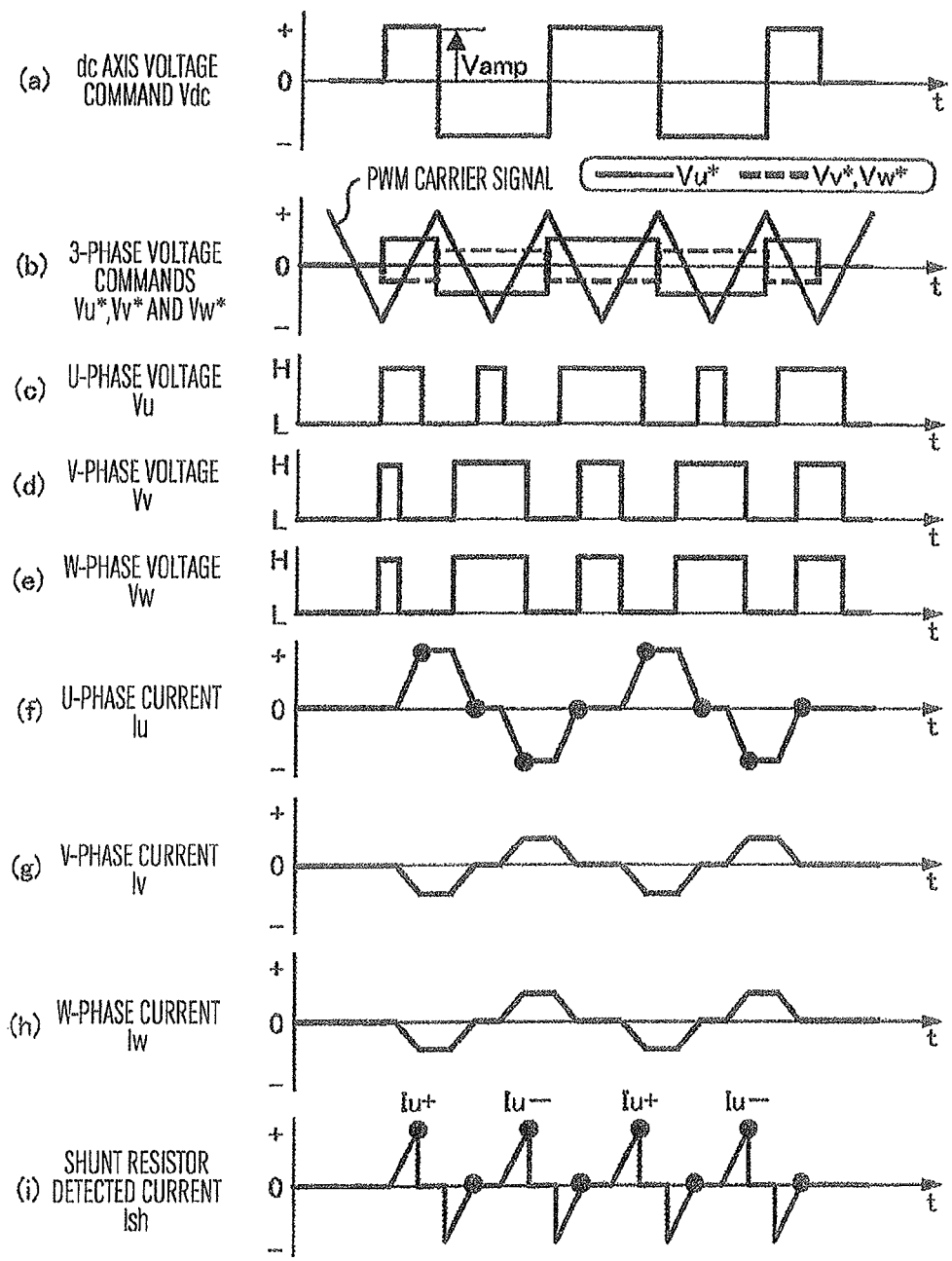
FIG. 10 is an operation waveform diagram obtained when a high frequency voltage is applied to a dc axis in the conventional art.
Figure 11:
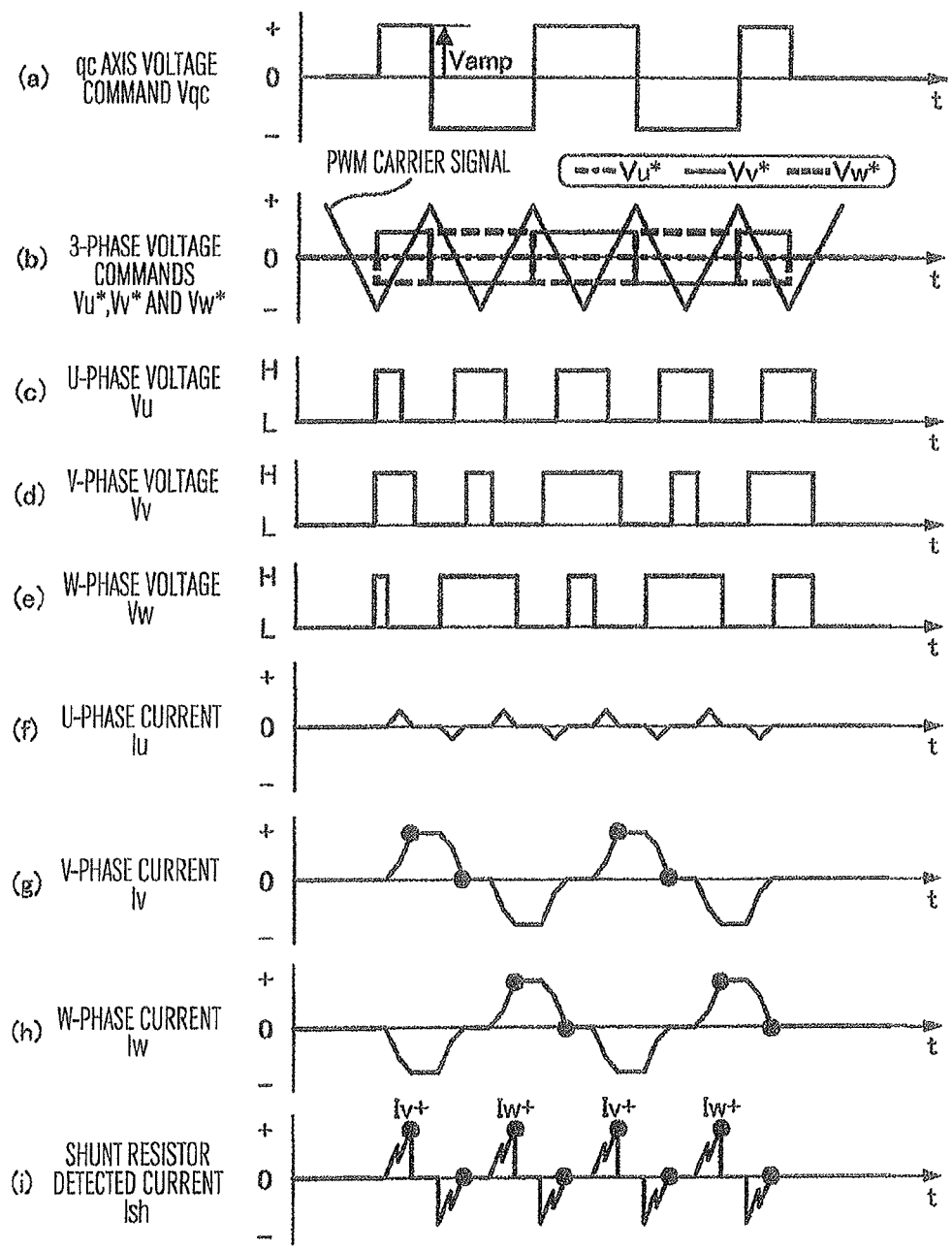
FIG. 11 is an operation waveform diagram obtained when a high frequency voltage is applied to a qc axis in the conventional art.

According to JP-A-2006-158101 described as the conventional art, an alternating voltage is applied to each of a rotation coordinate axis (dc axis) of a control apparatus and an axis (qc axis) perpendicular to the rotation coordinate axis, and three-phase pulsating currents generated at that time are detected. And estimation computation of the magnetic pole position of the permanent magnet synchronous motor is conducted on the basis of the current values. FIG. 10 shows operation waveforms obtained when a positive-negative alternating voltage is supplied to the dc axis. FIG. 11 shows operation waveforms obtained when a similar positive-negative alternating voltage is supplied to the qc axis.

A dc axis voltage command Vdc shown in (a) of FIG. 10 is transformed to three-phase voltage commands. As a U-phase voltage command Vu*, a square wave signal having magnitude of Vamp is output. As each of a V-phase voltage command Vv* and a W-phase voltage command, a square wave signal having magnitude equal to half of Vamp is output.

Figure 12:
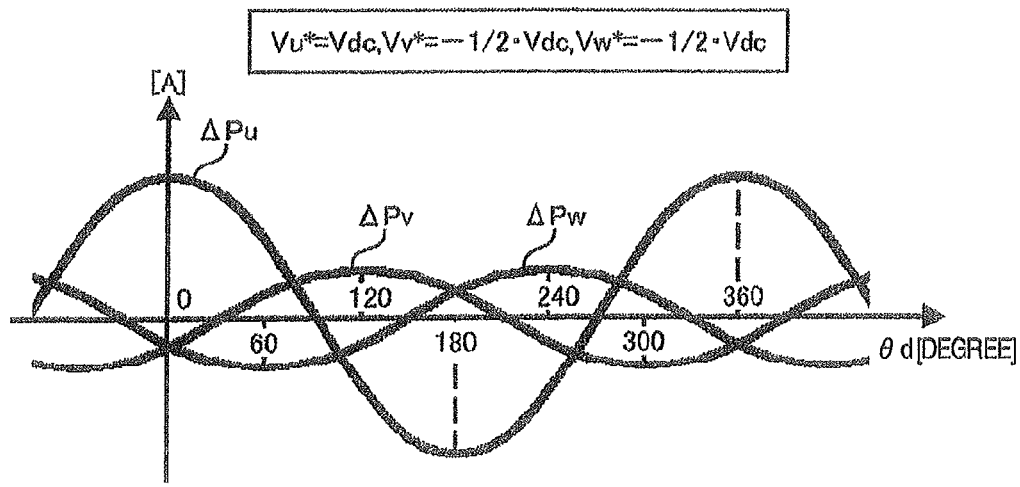
FIG. 12 is a diagram showing relations between deviation quantities of change of a positive side and a negative side current flowing through three-phase stator windings and the rotor magnetic pole position, obtained when a high frequency voltage is applied to the dc axis in the conventional art.

In the dc axis voltage application, changes of "positive-negative asymmetry" of respective phase currents generated by the three-phase voltage commands Vu*, Vv* and Vw* depending upon the rotor magnetic pole position θd become as shown in FIG. 12. ΔPu shown in FIG. 12 is a current characteristic of "positive-negative asymmetry" obtained by magnetic saturation of the iron core when the rotor magnetic pole position θd is at an arbitrary phase and a U-phase voltage command Vu* having magnitude of Vamp is applied to the u-axis (θdc=0). ΔPv shown in FIG. 12 is a current characteristic of "positive-negative asymmetry" obtained by magnetic saturation of the iron core when a V-phase voltage command Vv* having magnitude equal to half of Vamp is applied to the v-axis (θdc=120). ΔPw shown in FIG. 12 is a current characteristic of "positive-negative asymmetry" obtained by magnetic saturation of the iron core when a W-phase voltage command Vw* having magnitude equal to half of Vamp is applied to the w-axis (θdc=240). When the rotor magnetic pole position θd is at an arbitrary phase, currents depending upon magnitudes of the three-phase voltage commands Vu*, Vv* and Vw* flow to respective phases. As described with reference to FIG. 9, the amplitude of characteristic of the "positive-negative asymmetry" of the current increases nonlinearly as compared with ratios among the applied three-phase voltage commands Vu*, Vv* and Vw*. Amplitudes of the current characteristics ΔPu, ΔPv and ΔPw in respective phases do not assume the ratio of 1:½:½.

Figure 13:
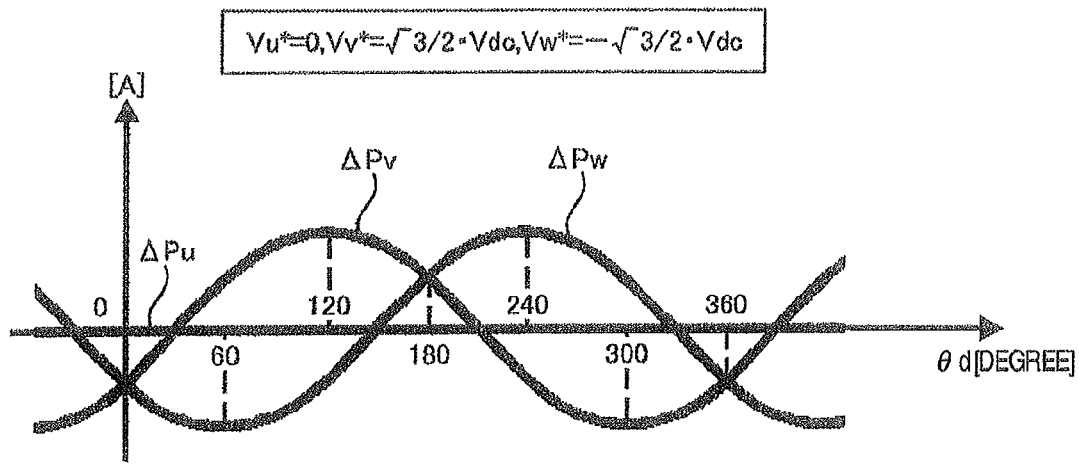
FIG. 13 is a diagram showing relations between deviation quantities of change of a positive side and a negative side current flowing through three-phase stator windings and the rotor magnetic pole position, obtained when a high frequency voltage is applied to the qc axis in the conventional art.

A qc axis voltage command Vqc shown in (a) of FIG. 11 is transformed to three-phase voltage commands. As a U-phase voltage command Vu*, zero is output. As each of a V-phase voltage command Vv* and a W-phase voltage command, a square wave signal having magnitude equal to $\sqrt{3}/2$ of Vamp is output. In the qc axis voltage application, changes of "positive-negative asymmetry" of respective phase currents generated by the three-phase voltage commands Vu*, Vv* and Vw* depending upon the rotor magnetic pole position θd become as shown in FIG. 13. ΔPu shown in FIG. 13 is a current characteristic of "positive-negative asymmetry" obtained by magnetic saturation of the iron core when the rotor magnetic pole position θd is at an arbitrary phase and a U-phase voltage command Vu* having zero output is applied to the u-axis (θdc=0). ΔPv shown in FIG. 13 is a current characteristic of "positive-negative asymmetry" obtained by magnetic saturation of the iron core when a V-phase voltage command Vv* having magnitude equal to $\sqrt{3}/2$ of Vamp is applied to the v-axis (θdc=120). ΔPw shown in FIG. 13 is a current characteristic of "positive-negative asymmetry" obtained by magnetic saturation of the iron core when a W-phase voltage command Vw* having magnitude equal to $\sqrt{3}/2$ of Vamp is applied to the w-axis (Δdc=240). In the same way as the case of the dc axis voltage application, amplitudes of the characteristics of "positive-negative asymmetry" ΔPu, ΔPv and ΔPw in respective phases do not assume the ratio of $0:\sqrt{3}/2:\sqrt{3}/2$ as compared with the ratio of $0:\sqrt{3}/2:\sqrt{3}/2$ which is the ratio among magnitudes of the applied three-phase voltage commands Vu*, Vv* and Vw*, because of the above-described nonlinear characteristics.

Figure 14:
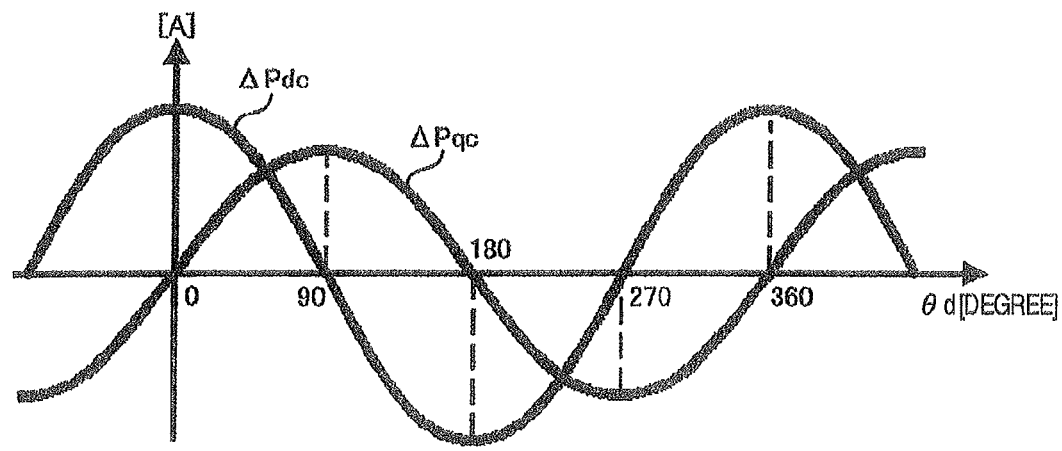
FIG. 14 is a diagram showing a relation between a synthetic current deviation quantity ΔPdc obtained when a dc axis pulse voltage is applied and a synthetic current deviation quantity ΔPqc obtained when a qc-axis pulse voltage is applied, in the conventional art.
Figure 15:
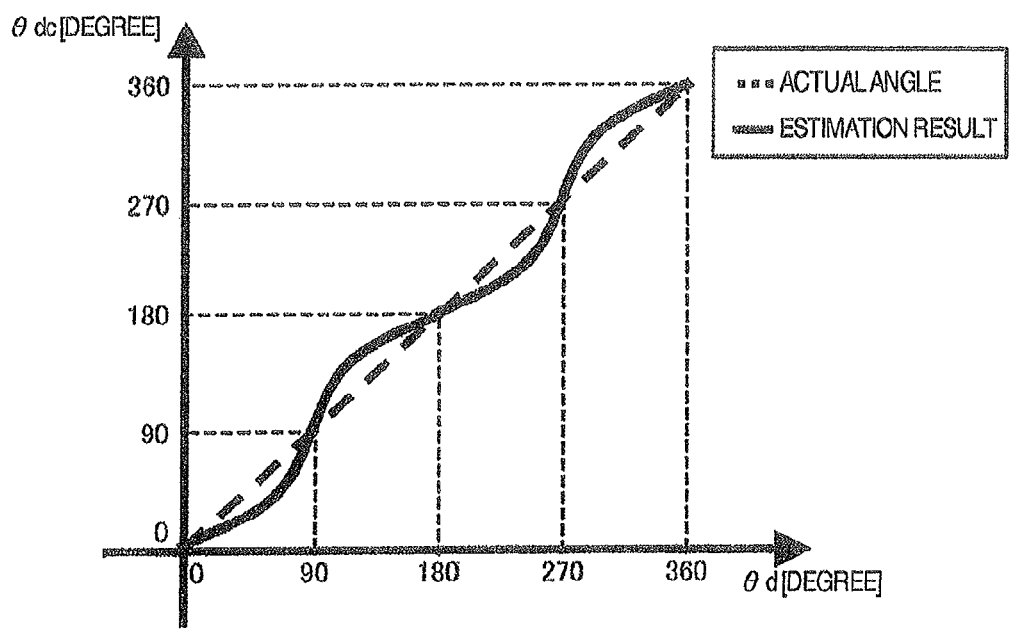
FIG. 15 shows an example of an estimation error generated by two orthogonal axes pulse voltage application in the conventional art.

An initial position estimation unit proposed in JP-A-2006-158101 calculates a characteristic ΔPdc of "positive-negative asymmetry" of the current change on the dc axis obtained by applying an alternating voltage onto the dc axis, calculates a characteristic ΔPqc of "positive-negative asymmetry" of the current change on the qc axis obtained by applying an alternating voltage onto the qc axis, and estimates the initial position on the basis of arctangent of ΔPdc and ΔPqc. FIG. 14 shows current changes on the dc axis and the qc axis in the dc axis qc axis voltage application with due regard to the "positive-negative asymmetry" of the current caused by the magnetic saturation of the iron core. ΔPdc shown in FIG. 14 is a dc axis component obtained by conducting inverse transformation of the characteristics ΔPu, ΔPv and ΔPw of currents respectively flowing to the three phases to the dc axis and qc axis when the rotor magnetic pole position θd is at an arbitrary phase in FIG. 12. ΔPqc shown in FIG. 14 is a qc axis component obtained by conducting inverse transformation of the characteristics ΔPu, ΔPv and ΔPw of currents respectively flowing to the three phases to the dc axis qc axis in the same way when the rotor magnetic pole position θd is at an arbitrary phase in FIG. 13. With respect to the magnitude ratio of the applied voltages, the influence of the magnetic saturation upon the current change has a nonlinear characteristic. Even if the ratio in applied voltage between the dc axis and the qc axis is set to 1:1, therefore, the current change on the dc axis and that on the qc axis caused by synthetic operation of three-phase currents to the two orthogonal axis components do not assume the ratio of 1:1. ΔPdc and ΔPqc become current characteristics of "positive-negative asymmetry" having different amplitudes as shown in FIG. 14. In the initial position estimation based on arctangent of ΔPdc and ΔPqc, therefore, the magnetic pole position estimation error as shown in FIG. 15 is generated.

In the case where a high frequency voltage is applied to the two orthogonal axes successively and current characteristics of the "positive-negative asymmetry" of the three-phase pulsating currents generated at that time are coordinate-transformed to the two orthogonal axes as described above, the initial estimation error is generated. Because in the linear transformation such as the coordinate transformation the influence of nonlinear characteristics caused by differences in magnitude among actually applied three-phase fixed axis voltage cannot be taken into consideration. In the present invention, therefore, a control method for the power converter and a current detection unit are considered to cause the current characteristics of the "positive-negative asymmetry" caused by the magnetic saturation on the three-phase fixed axes before the coordinate transformation to the two orthogonal axes to assume the same amplitude. In accordance with the present invention, a positive-negative alternating voltage is applied to three phases shifted by 120 degrees successively, and phase current values caused by applying the positive-negative alternating voltage are detected. And deviation quantities ΔPu, ΔPv and ΔPw between positive and negative detected current values respectively of three phases are found. Coordinate transformation to the two orthogonal axes is conducted. Then the rotor magnetic pole position is calculated by using arctangent. Amplitudes of the characteristics ΔPu, ΔPv and ΔPw of the "positive-negative asymmetry" caused by the magnetic saturation can be made even by applying the positive-negative alternating voltage successively to three phases shifted by 120 degrees and equalizing voltage applying conditions for detected current values of three phases utilized for the position estimation computation. Even if in this case the characteristics ΔPu, ΔPv and ΔPw are coordinate-transformed to the two orthogonal axes, nonlinear characteristics of the three phases having the same amplitude are transformed to the two orthogonal axes and it is linear transformation, resulting in no problem. As a result, the position estimation error caused by shifts in amplitude among the characteristics ΔPu, ΔPv and ΔPw is not generated, and the position estimation precision can be improved as compared with the conventional art.

By the way, the reference phase angle θ in the command voltage generation unit 104 is a fixed value, and its value can be set in the range of −30 degrees to +30 degrees. Herein, operation will be described while showing actual operation waveforms for the case where θ=0 and θ=15 degrees.

Figure 16:
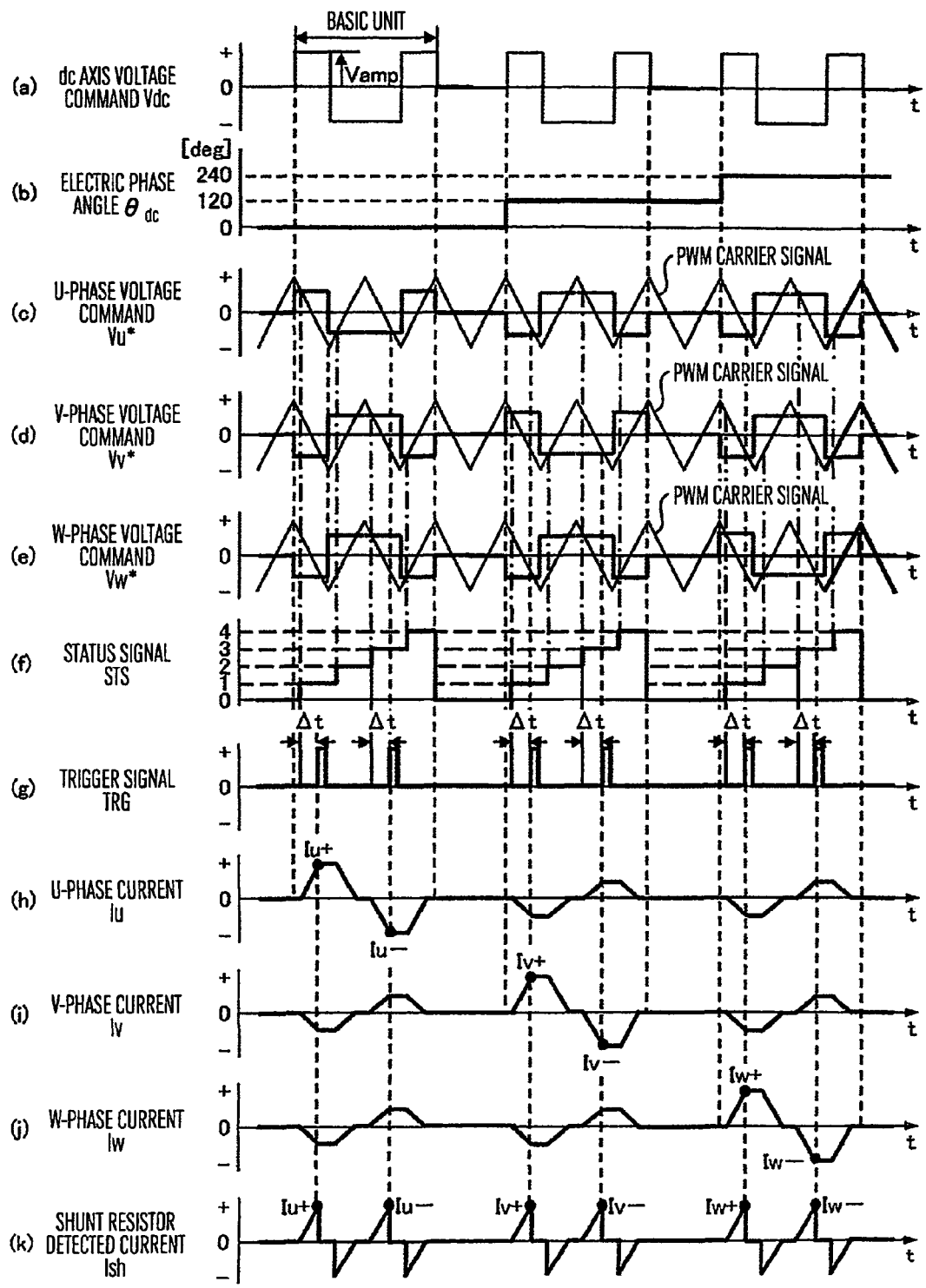
FIG. 16 shows an example of current detection timing in the first embodiment of the present invention.

FIG. 16 shows output signals and output current waveforms obtained when the reference phase angle θ is set to θ=0 degree in the present embodiment. In FIG. 16, (a) shows a signal waveform of a dc axis voltage command Vdc, and (b) shows a change of the electric phase angle θdc. When the reference phase angle θ=0, the electric phase angle θdc is switched to 0 degree, 120 degrees and 240 degrees, successively. In FIG. 16, (c), (d) and (e) show waveforms of the three-phase voltage commands Vu*, Vv* and Vw* and a waveform of the PWM carrier signal. Phase current waveforms of the permanent magnet synchronous motor 103 flow as the phase currents Iu, Iv and Iw as shown in (h), (i) and (j) of FIG. 16. In FIG. 16, (k) shows the detected current signal Ish which flows through the DC resistor 111.

In FIG. 16, (f) and (g) show the status signal STS and the trigger signal TRG for determining for determining current detection timing. In the present embodiment, the status signal STS is a counter value added by +1 whenever an output voltage level of at least one phase changes from a state in which all of the three-phase output voltages of the power converter become positive (or negative) (in other words, timing of a wave crest or a wave bottom of the PWM carrier signal taking the shape of a triangular wave). Therefore, the status signal STS is incremented once every half period of the PWM carrier signal. If the basic unit of the high frequency applied voltage is output, then the status signal STS is reset to zero at the end of the basic unit. Furthermore, the status signal STS is kept zero over a time period in which the voltage command Vdc is 0. In the present embodiment, the basic unit of the high frequency applied voltage corresponds to two periods of the PWM carrier signal. Therefore, the status signal STS counts up from 1 to 4 during the basic unit of the high frequency applied voltage. On the other hand, the trigger signal TRG is a pulse signal which is output when time of Δt has elapsed from timing of transition of the status signal STS from 0 to 1 or from 2 to 3. By the way, Δt is a predetermined fixed value, and it is set to be shorter than a time period between transition of the stats from 0 to 1 (or from 2 to 3) and transition of all of the three-phase output voltages of the power converter to the positive state or the negative state.

Figure 17:
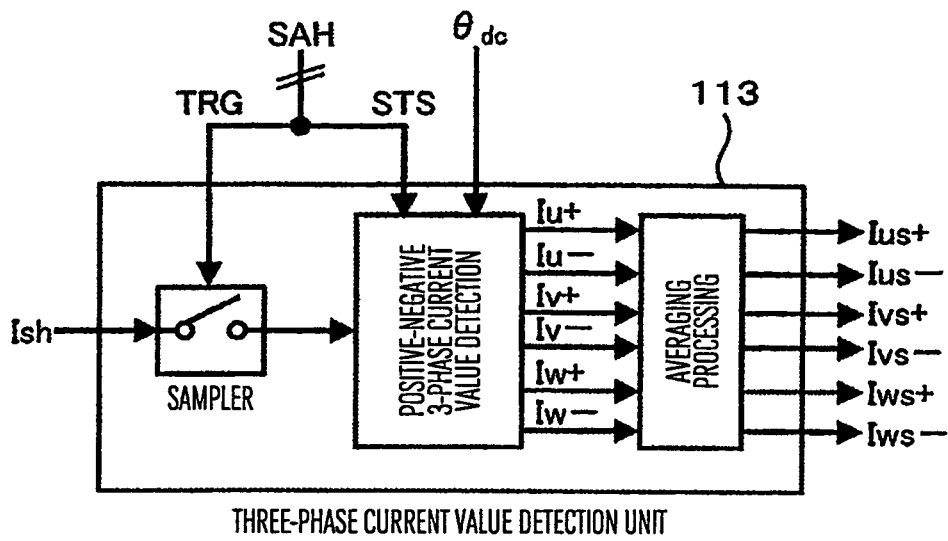
FIG. 17 is a functional block diagram of a three-phase current detection unit in the first embodiment of the present invention.

FIG. 17 shows an internal function block diagram of the three-phase current value detection unit 113. In accordance with the present invention, the magnetic pole position estimation is conducted by detecting the detected current signal Ish information which flows through the DC resistor 111 and suitably sampling the phase current information which appears in Ish. A sampler in the three-phase current value detection unit 113 samples the detected current Ish at the time when the pulse of the trigger signal TRG has become the high level. The trigger signal TRG and sample timing of detected current values utilized for the magnetic pole position estimation are shown in FIG. 16. Black dots (●) in current waveforms shown in (h), (i), (j) and (k) of FIG. 16 indicate sampled current values. Sampled Ish values are distributed to positive and negative values of respective phase currents on the basis of information of the electric phase angle θdc and the status signal STS. The distribution is conducted according to the following rules.

A sample value of Ish obtained in response to a TRG signal which is generated when θdc=0 degree and STS=1 is regarded as a U-phase positive side current Iu+.

A sample value of Ish obtained in response to a TRG signal which is generated when θdc=0 degree and STS=3 is regarded as a U-phase negative side current Iu−.

A sample value of Ish obtained in response to a TRG signal which is generated when θdc=120 degrees and STS=1 is regarded as a V-phase positive side current Iv+.

A sample value of Ish obtained in response to a TRG signal which is generated when θdc=120 degrees and STS=3 is regarded as a V-phase negative side current Iv−.

A sample value of Ish obtained in response to a TRG signal which is generated when θdc=240 degrees and STS=1 is regarded as a W-phase positive side current Iw+.

A sample value of Ish obtained in response to a TRG signal which is generated when θdc=240 degrees and STS=3 is regarded as a W-phase negative side current Iw−.

Positive and negative current values of the three phases having equal amplitudes in the current characteristics of the "positive-negative asymmetry" can be detected by sampling the pulsating current as described above.

An example in which a positive-side phase current is sampled once and a negative side phase current is sampled once during the basic unit of the high frequency applied voltage is shown in FIG. 16. If the number of times of sampling is one, however, there is a problem that a position estimation error is generated under the influence of a current detection error caused by noise. As its countermeasure, a method of applying the basic unit of the high frequency voltage an arbitrary number of times (n times) repetitively during each of time periods when θdc assumes values of 0 degree, 120 degrees and 240 degrees and sampling the currents n rimes may be used. Here, n is an integer of at least 2. In FIG. 17, averaging processing in the phase current detection unit 113 outputs an averaged U-phase positive side current value Ius+ on the basis of Iu+ data sampled n times. The same is true of Ius−, Ivs+, Ivs−, Iws+ and Iws− as well. As an effect obtained by averaging detected current values, decrease of the position estimation error can be mentioned because the influence of noise can be decreased.

Figure 18:
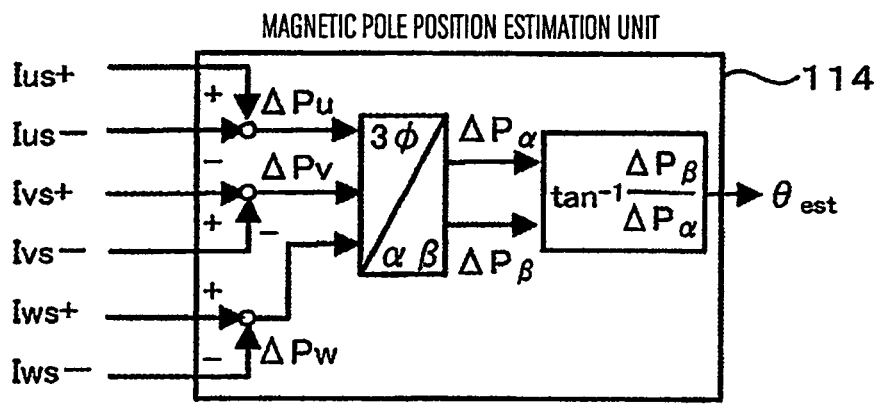
FIG. 18 is a functional block diagram of a magnetic pole estimation unit in the first embodiment of the present invention.

The magnetic pole position estimation unit 114 shown in FIG. 1 will now be described. FIG. 18 shows an internal function block diagram of the magnetic pole position estimation unit 114. The magnetic pole position estimation unit 114 computes an estimated magnetic pole position θest on the basis of the positive and negative detected three-phase current values Ius+, Ius−, Ivs+, Ivs−, Iws+ and Iws− which are output from the three-phase current value detection unit 113.

First, in each phase of the three phases, deviation quantities ΔPu, ΔPv and ΔPw between positive and negative current values are computed on the basis of Ius+, Ius−, Ivs+, Ivs−, Iws+ and Iws−.

$$\begin{cases} \Delta P_u = |I_{us+}| - |I_{us-}| \\ \Delta P_v = |I_{vs+}| - |I_{vs-}| \\ \Delta P_w = |I_{ws+}| - |I_{ws-}| \end{cases} \quad (6)$$

As described earlier, the magnitude of the permanent magnet magnetic flux included in the interlinkage magnetic flux of a winding changes depending upon the rotor magnetic pole position θd. As a result, values of the deviation quantities ΔPu, ΔPv and ΔPw also depend upon the rotor magnetic pole position θd.

Then, the sine component and the cosine component of the rotor magnetic pole position θd are derived from ΔPu, ΔPv and ΔPw.

In accordance with the present invention, coordinate transformation of the deviation quantities ΔPu, ΔPv and ΔPw to ΔPα and ΔPβ respectively on the α axis and the β axis which are two-phase orthogonal fixed axes is conducted according to Equation 7. ΔPα is a cosine component of θd, and ΔPβ is a sine component of θd.

$$\begin{cases} \Delta P_\alpha = \Delta P_u - \frac{1}{2} \cdot \Delta P_v - \frac{1}{2} \cdot \Delta P_w \\ \Delta P_\beta = \frac{\sqrt{3}}{2} \cdot \Delta P_v - \frac{\sqrt{3}}{2} \cdot \Delta P_w \end{cases} \quad (7)$$

Figure 19:
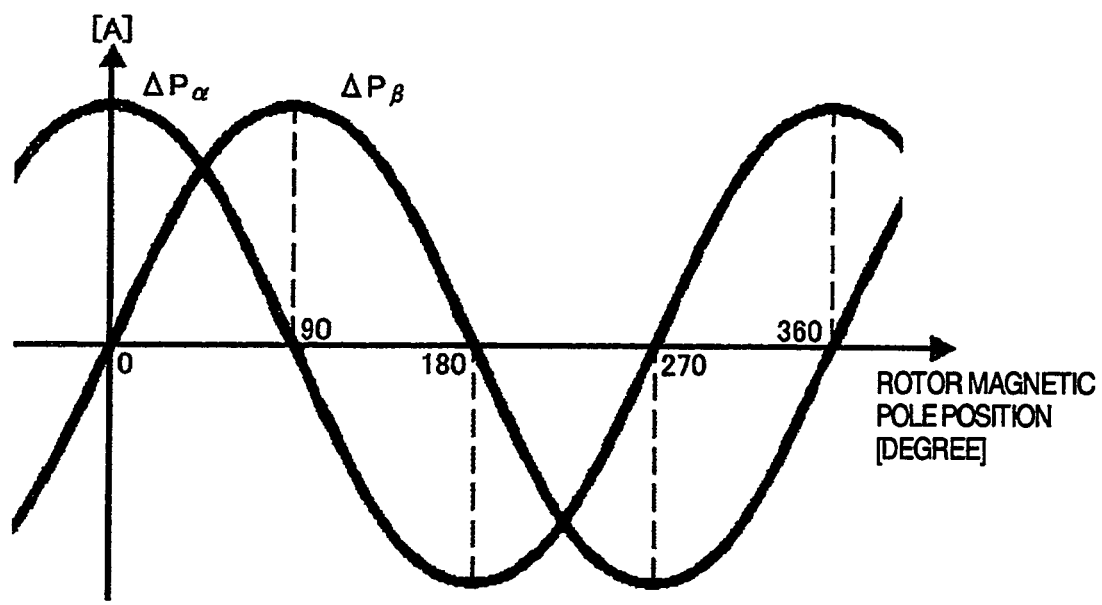
FIG. 19 is a diagram showing a relation between current deviation quantities on orthogonal two-phase fixed axes and the rotor magnetic pole position.

FIG. 19 shows an example of position depending characteristics of ΔPα and ΔPβ. The magnetic pole position estimation unit 114 calculates the estimated magnetic pole position θest of the permanent magnet synchronous motor by using an arctangent function on the basis of ΔPα and ΔPβ.

$$\theta_{est} = \tan^{-1} \frac{\Delta P_\beta}{\Delta P_\alpha} \quad (8)$$

According to the present embodiment, three high frequency voltages are applied successively with a shift of 120 degrees, and thereby voltage application conditions of pulse voltages in phases for detecting three-phase current values utilized for the position estimation computation are made equal. And current characteristics of "positive-negative asymmetry" having the same amplitude are extracted, and the initial position estimation is conducted as described heretofore. Therefore, there is an effect that the estimation precision is improved. As a result, the present invention brings about an effect that the start torque of the driven motor is improved.

In FIG. 16, the trigger signal TRG is set to be a pulse signal which changes when time Δt has elapsed from the time when the value of the status signal STS has become 1 or 3. However, other generation methods of the trigger signal TRG are also conceivable.

Figure 20:
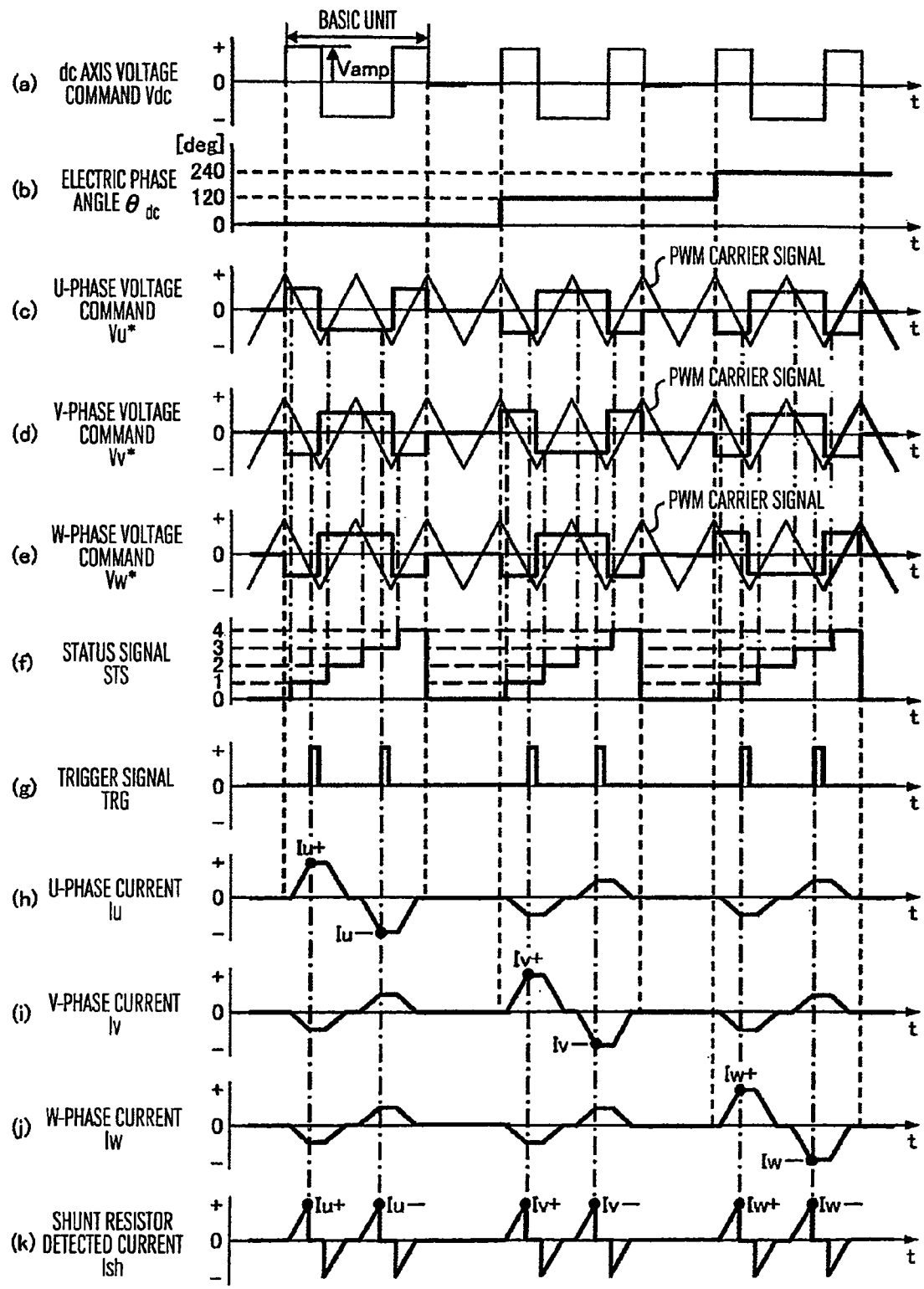
FIG. 20 shows another example of current detection timing in the first embodiment of the present invention.

FIG. 20 shows an example in which the trigger signal TRG is set to be a pulse signal generated at timing of transition of all output voltages of the three phases to positive values or negative values when the value of the status signal STS is 1 or 3. FIG. 20 shows operation waveforms at the time of the magnetic pole estimation in the same way as FIG. 16. The dc axis voltage command Vdc and the electric phase angle θdc are changed in the same way as FIG. 16. Furthermore, the phase currents Iu, Iv and Iw and the detected current signal Ish which flows through the DC resistor 111 also assume the same waveforms as those in FIG. 16. FIG. 20 differs from FIG. 16 in the generation method of the trigger signal TRG. When the value of the status signal STS is 1 in the time period of θdc=0, a pulse is output as the trigger signal TRG at timing of intersection of Vv* (or Vw*) and the PWM carrier signal. In the same way, when the value of the status signal STS is 3 in the time period of θdc=0, a pulse is output as the trigger signal TRG at timing of intersection of Vu* and the PWM carrier signal. After the currents are detected, the three-phase current value detection unit 113 and the magnetic pole position estimation unit 114 can calculate the estimated magnetic pole position θest in accordance with a procedure which is similar to the above-described procedure.

If the detected current signal Ish is sampled according to the way of determining the timing shown in FIG. 20, the sample timing becomes the temporally remotest from the time point of transition of the output voltage level of the power converter 102. As a result, Ish can be sampled with high precision without the influence of ringing or the like caused by the switching at the time of transition of the output voltage of the power converter 102. This brings about an effect that the errors of the position estimation are reduced.

In the ensuing description, examples in which the reference phase angle θ in the command voltage generation unit 104 is set to θ=0 have been described. Even if the reference phase angle is shifted, however, the initial magnetic pole position estimation can be conducted in the same way by changing the pulse output condition of the trigger signal TRG. Hereafter, it will be described with reference to drawings.

Figure 21:
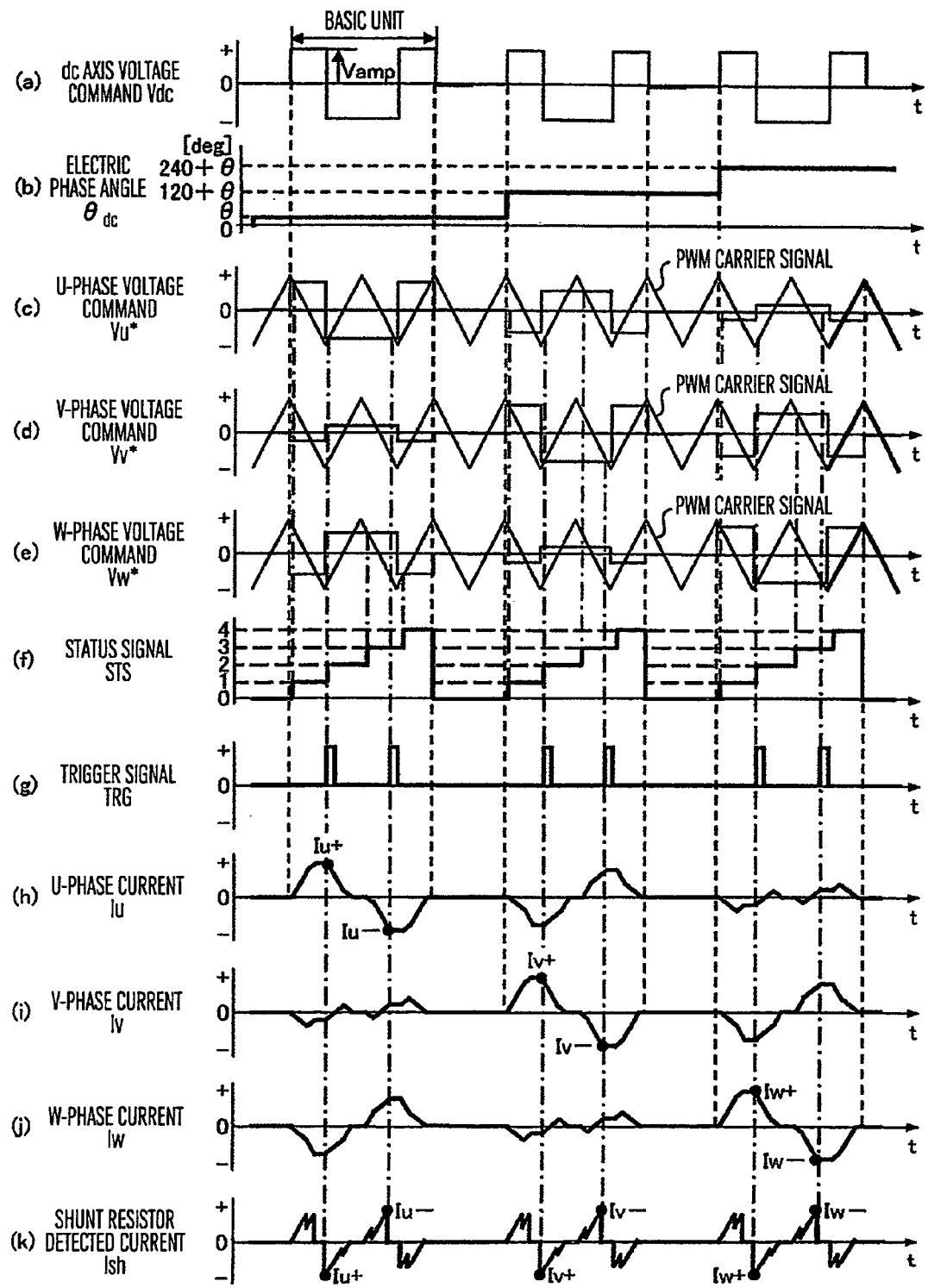
FIG. 21 shows an example of current detection timing obtained when a reference phase angle θ=15 degrees in the first embodiment of the present invention.

FIG. 21 shows operation waveforms obtained in the magnetic pole position estimation when the reference phase angle θ is set equal to θ=15 degrees. In FIG. 21, (a) shows an output waveform of the dc-axis voltage command Vdc, which is the same as that shown in FIG. 16. In FIG. 21, (b) shows an output waveform of the electric phase angle θdc at which the dc axis voltage command Vdc is applied. If the reference phase angle θ=15 degrees, the electric phase angle θdc is switched to 15 degrees, 135 degrees and 255 degrees successively and output. In FIG. 21, (c), (d) and (e) show three-phase voltage commands Vu*, Vv* and Vw* obtained by transforming Vdc and θdc in the dq coordinate inverse transformer 107. In FIG. 21, (f) and (g) show the status signal STS and the trigger signal TRG for determining the timing of current detection. Current waveforms generated in the permanent magnet synchronous motor 3 change as the phase currents Iu, Iv and Iw as shown in (h), (i) and (j) of FIG. 21. In FIG. 21, (k) shows the detected current signal Ish which flows through the DC resistor 111.

The generation method of the status signal STS shown in (f) of FIG. 21 is the same as that in FIG. 16. On the other hand, the trigger signal shown in (g) of FIG. 21 is obtained by combining a pulse signal generated at timing of the value of the status signal STS becoming 2 with a pulse signal generated at timing of transition of all output voltages of the three phases to positive (or negative) values. The positive and negative current values of the three phases can be detected by detecting the detected current signal Ish at timing of the pulse output of the trigger signal TRG Black dots (●) in current waveforms shown in (h), (i), (j) and (k) of FIG. 21 indicate sampled current values. Sampled Ish values are distributed to positive and negative values of respective phase currents on the basis of information of the electric phase angle θdc and the status signal STS. The distribution is conducted according to the following rules.

A sample value of Ish obtained in response to a TRG signal which is generated when θdc=0 and STS=2 is regarded as a U-phase positive side current Iu+.

A sample value of Ish obtained in response to a TRG signal which is generated when θdc=0 and STS=3 is regarded as a U-phase negative side current Iu−.

A sample value of Ish obtained in response to a TRG signal which is generated when θdc=θ+120 degrees and STS=2 is regarded as a V-phase positive side current Iv+.

A sample value of Ish obtained in response to a TRG signal which is generated when θdc=θ+120 degrees and STS=3 is regarded as a V-phase negative side current Iv−.

A sample value of Ish obtained in response to a TRG signal which is generated when θdc=θ+240 degrees and STS=2 is regarded as a W-phase positive side current Iw+.

A sample value of Ish obtained in response to a TRG signal which is generated when θdc=θ+240 degrees and STS=3 is regarded as a W-phase negative side current Iw−.

Positive and negative current values of the three phases are detected at timing of amplitudes of current characteristics of "positive-negative asymmetry" caused by the magnetic saturation of the iron core becoming equal. Thereafter, the averaging processing in the three-phase current value detection unit 113 and the magnetic pole position estimation unit 114 can calculate the estimated magnetic pole position θest in accordance with a procedure which is similar to the above-described procedure.

FIG. 21 shows an example in which application timing of the dc-axis voltage command Vdc begins with a wave crest of a triangular wave carrier. In the case where application timing begins with a wave bottom of the triangular wave carrier, the pulse output condition of the trigger signal TRG must be changed. This will now be described with reference to FIG. 22.

Figure 22:
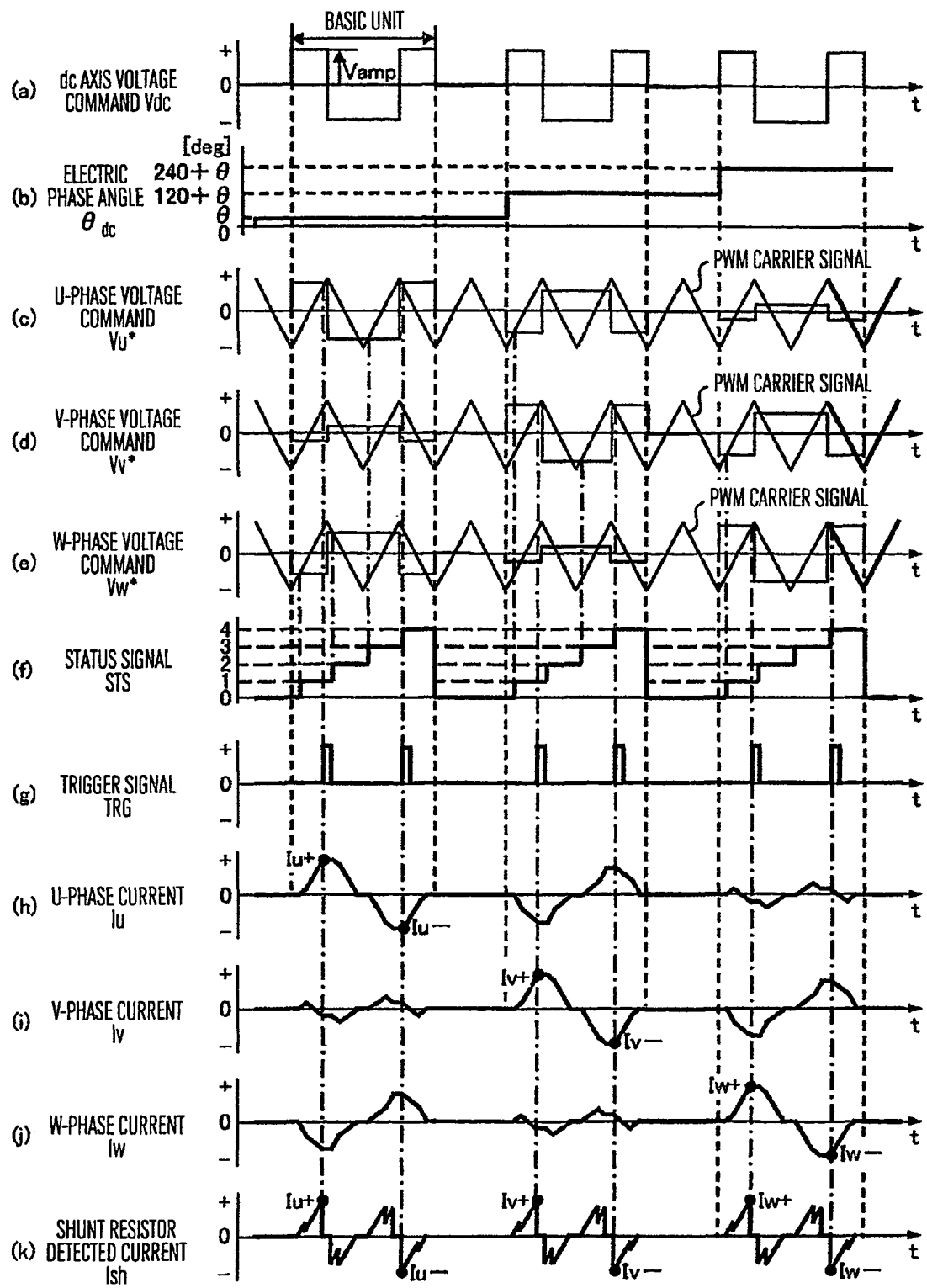
FIG. 22 shows another example of current detection timing obtained when a reference phase angle θ=15 degrees in the first embodiment of the present invention.

FIG. 22 shows operation waveforms in the magnetic pole position estimation at this time. The dc axis voltage command Vdc and the electric phase angle θdc have the same output waveform as those in FIG. 21. Generated phase currents Iu, Iv and Iw and the current Ish which flows through the DC current 111 differ from the output waveforms shown in FIG. 21 because the application timing of the voltage command Vdc begins with the wave bottom of the triangular wave carrier. In FIG. 22, therefore, the trigger signal TRG which determines the timing of detection of the three-phase current values from the current Ish differs.

In FIG. 22, the status signal STS shown in (f) of FIG. 22 can be generated in the same way as that in FIG. 16. On the other hand, as for the trigger signal TRG shown in FIG. 22, a pulse is generated at timing of transition of all output voltages of the three-phases to positive values or negative values when STS is 1 and at timing of transition of STS from 3 to 4. If the detected current signal Ish is detected by forming pulses of the trigger signal TRG in this way, the positive and negative current values of the three phases can be detected. Black dots (●) in current waveforms shown in (h), (i), (j) and (k) of FIG. 22 indicate sampled current values. Sampled Ish values are distributed to positive and negative values of respective phase currents on the basis of information of the electric phase angle θdc and the status signal STS. The distribution is conducted according to the following rules.

A sample value of Ish obtained in response to a TRG signal which is generated when θdc=θ and STS=1 is regarded as a U-phase positive side current Iu+.

A sample value of Ish obtained in response to a TRG signal which is generated when θdc=θ and STS=4 is regarded as a U-phase negative side current Iu−.

A sample value of Ish obtained in response to a TRG signal which is generated when θdc=θ+120 degrees and STS=1 is regarded as a V-phase positive side current Iv+.

A sample value of Ish obtained in response to a TRG signal which is generated when θdc=θ+120 degrees and STS=4 is regarded as a V-phase negative side current Iv−.

A sample value of Ish obtained in response to a TRG signal which is generated when θdc=θ+240 degrees and STS=1 is regarded as a W-phase positive side current Iw+.

A sample value of Ish obtained in response to a TRG signal which is generated when θdc=θ+240 degrees and STS=4 is regarded as a W-phase negative side current Iw−.

Positive and negative current values of the three phases are detected at timing of amplitudes of current characteristics of "positive-negative asymmetry" caused by the magnetic saturation of the iron core becoming equal. Thereafter, the averaging processing in the three-phase current value detection unit 113 and the magnetic pole position estimation unit 114 can calculate the estimated magnetic pole position θest in accordance with a procedure which is similar to the above-described procedure.

Even in the case where the positive-negative alternating voltage is applied to phases which are shifted by the reference phase angle θ and a plurality of phase current waveforms appear across the shunt resistor mixedly, high precision initial position estimation can be implemented in the present embodiment by following the above-described sample timing and the distribution rules, as described above.

Figure 23:
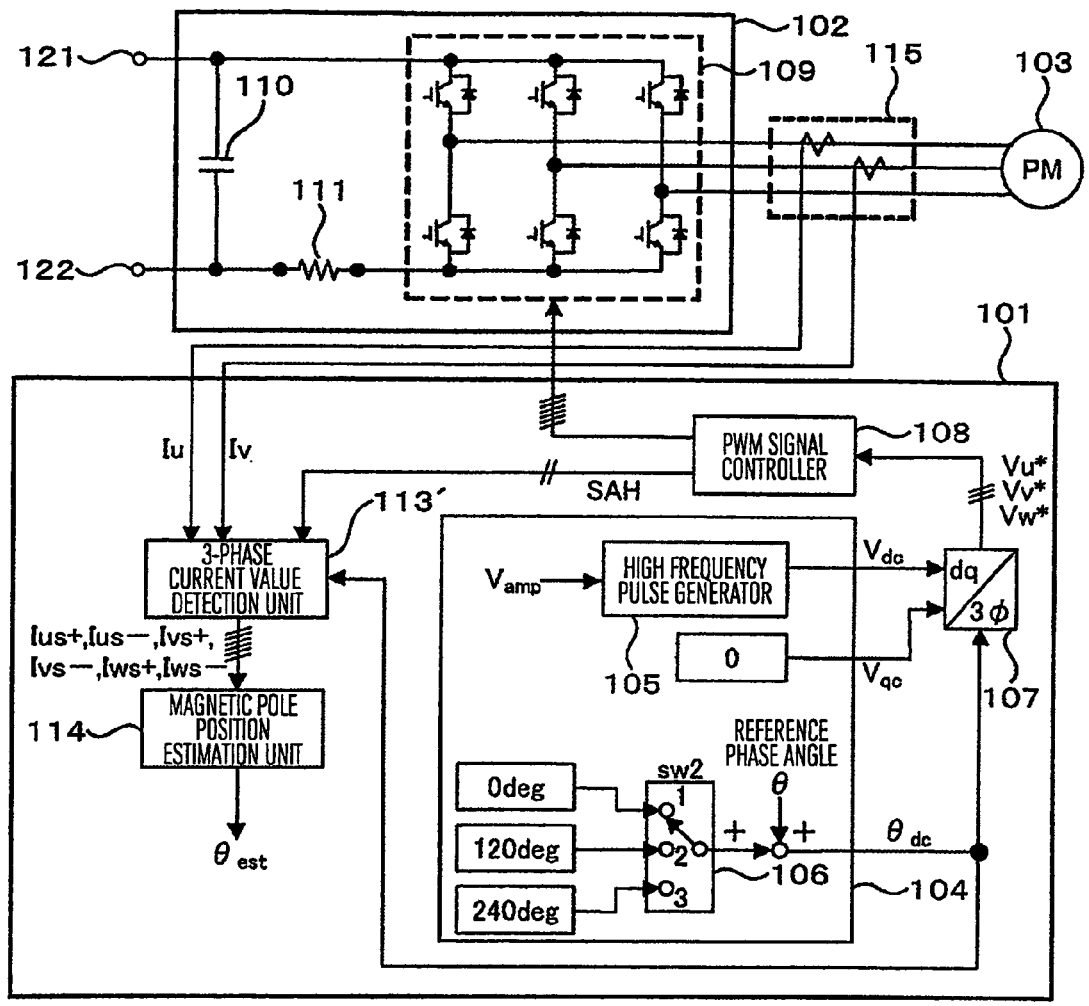
FIG. 23 is a general control block diagram in a second embodiment of the present invention.

A second embodiment of the present invention will now be described. The second embodiment is an example in which the motor currents are observed by using phase current sensors. FIG. 23 is a configuration diagram of the driving system of permanent magnet synchronous motor according to the second embodiment. Only parts which are different in configuration from the first embodiment shown in FIG. 1 will now be described. A phase current detection unit 115 shown in FIG. 23 detects currents Iu and Iv which respectively flows to the U-phase and V-phase among the three-phase stator windings of the permanent magnet synchronous motor 3. A three-phase current detection unit 113' outputs the positive-side detected value of the three-phase current values and the negative-side detected value of the three-phase current values on the basis of the detected currents Iu and Iv, the current detection timing setting signal SAH which is output by the PWM signal controller 108, and the electric phase angle θdc.

Figure 24:
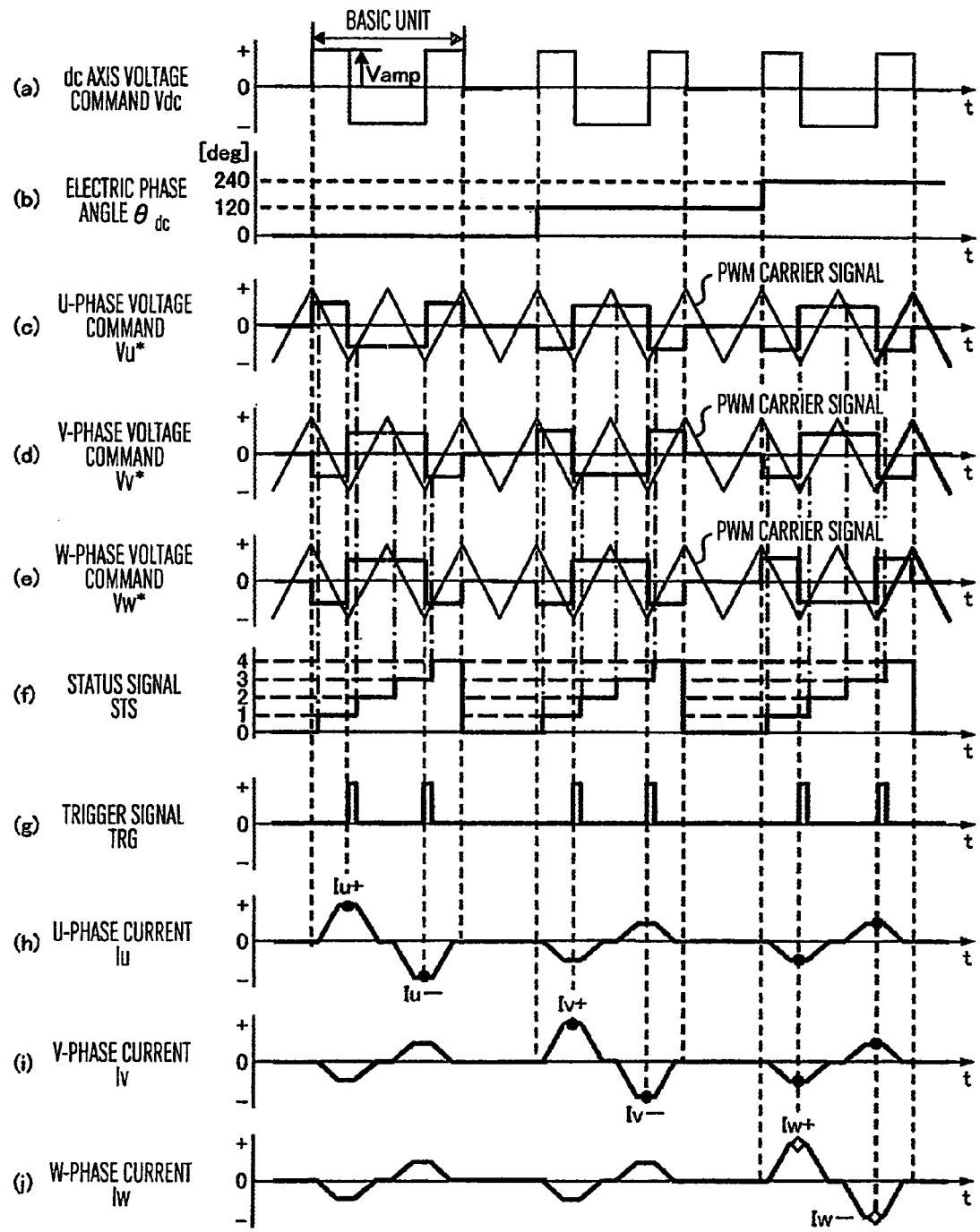
FIG. 24 shows an example of current detection timing in the second embodiment of the present invention.

FIG. 24 shows relations between output signals and output current waveforms in the case where the reference phase angle θ is set equal to θ=0 degree. Here, the dc axis voltage command Vdc and the electric phase angle θdc are changed in the same way as FIG. 16 which is used in the description of the first embodiment. The phase currents Iu, Iv and Iw also have the same waveforms as those shown in FIG. 16. The generation method of the status signal STS is also the same as that shown in FIG. 16. FIG. 24 differs only in the generation method of the trigger signal TRG from FIG. 16.

In the second embodiment, the trigger signal TRG is generated at timing of the triangular wave PWM carrier signal becoming a wave crest or wave bottom when the value of the status signal STS is 1 or 3. In the operation waveform example, the TRG signal is output at timing of the PWM carrier signal becoming a wave bottom.

Phase currents are detected at timing of the pulse output of the trigger signal TRG. Black dots (●) in current waveforms shown in (h) and (i) of FIG. 24 indicate sampled current values. In the present embodiment, the phase current detection unit 115 detects only the U-phase Iu and the V-phase current Iv. The W-phase current Iw which cannot be detected directly is calculated from the detected values of the U-phase and the V-phase on the basis of Equation (9).

$$Iw = -(Iu + Iv) \quad (9)$$

Rhomb marks (◇) in the current waveform of Iw shown in (j) of FIG. 24 indicate calculated W-phase positive side detected value Iw+ and W-phase negative side detected value Iw−.

Figure 25:
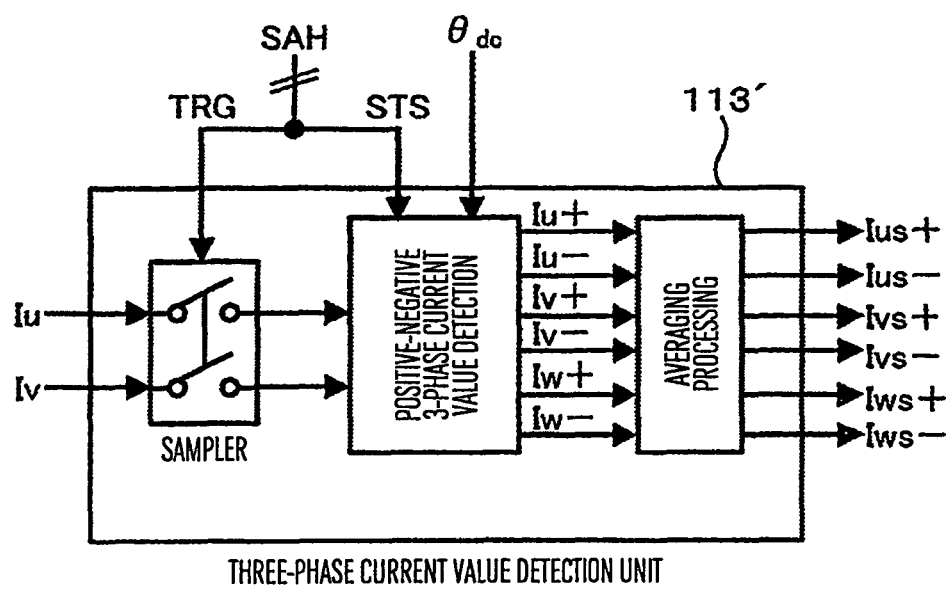
FIG. 25 is a function block diagram of a three-phase current detection unit in the second embodiment of the present invention.

An internal configuration of the three-phase current value detection unit 113' in the second embodiment is shown in FIG. 25. The phase currents Iu and Iv are sampled at the above described timing, and sampled phase current values are distributed to positive and negative current values of respective phases on the basis of information of the electric phase angle θdc and the status signal STS. The distribution is conducted according to the following rules.

A sample value (●) of the U-phase current Iu obtained in response to a TRG signal which is generated when θdc=0 degree and STS=1 is regarded as a U-phase positive side current Iu+.

A sample value (●) of the U-phase current Iu obtained in response to a TRG signal which is generated when θdc=0 degree and STS=3 is regarded as a U-phase negative side current Iu−.

A sample value (●) of the V-phase current Iv obtained in response to a TRG signal which is generated when θdc=120 degrees and STS=1 is regarded as a V-phase positive side current Iv+.

A sample value (●) of the V-phase current Iv obtained in response to a TRG signal which is generated when θdc=120 degrees and STS=3 is regarded as a V-phase negative side current Iv−.

A W-phase current calculated from the sample values (●) of the U-phase current Iu and the V-phase current Iv obtained in response to a TRG signal which is generated when θdc=240 degrees and STS=1 is regarded as a W-phase positive side current Iw+.

A W-phase current calculated from the sample values (●) of the U-phase current Iu and the V-phase current Iv obtained in response to a TRG signal which is generated when θdc=240 degrees and STS=3 is regarded as a W-phase negative side current Iw−.

Processing of the detected positive and negative current values of the three-phases is conducted in the same way as the first embodiment. Specifically, averaging processing of the detected current values is conducted within the three-phase current detection unit 113' and the estimated magnetic pole position θest is calculated in the magnetic pole position estimation unit 114.

In the description of the second embodiment, an example in which the phase current detection unit 115 detects currents of the U-phase and the V-phase has been described. In the drive of the three-phase motor, however, a phase current which cannot be detected directly can be calculated from detected current values of two phases as well known. Even if two other phases are detected, therefore, the estimated magnetic pole position can be found in the same way. Furthermore, even if the phase current detection unit 115 detects currents of the three phases, i.e., U-phase, V-phase and W-phase, the estimated magnetic pole position can be found in the same way in the present invention.

In the description of the second embodiment, an example in which the reference phase angle θ in the command voltage generation unit 104 shown in FIG. 23 is set to θ=0 has been described. Even if the reference phase angle θ is given in the range of −30 to 30 degrees, however, position estimation computation can be conducted in accordance with a procedure similar to that described above.

The second embodiment is based on the phase current detection. If a current is detected at timing of a wave crest (or a wave bottom) of the PWM carrier signal, therefore, a peak value of the phase current is obtained. Unlike the first embodiment, therefore, it is not necessary to move the current detection timing forward or backward according to the amplitude of the voltage command. As compared with the first embodiment, therefore, the second embodiment has an advantage that the TRG signal can be generated simply. Furthermore, the phase current detection is not susceptible to the influence of high frequency components (ringing currents) of currents generated by switching in the power converter 102. Therefore, the precision of the estimated position value using the detected currents becomes high.

By the way, if currents of the U-phase and the V-phase are detected at current detection timing at dot (●) in each of examples respectively shown in FIGS. 16, 20, 21 and 22, position estimation computation can be conducted in the second embodiment in accordance with a procedure similar to the above-described procedure.

The case where the basic unit of the high frequency applied voltage is repeated a plurality of times will be described complementally. In the first embodiment and the second embodiment, the electric phase angle θdc is switched to 0 degree, 120 degrees and 240 degrees successively and a high frequency applied voltage is supplied to the dc axis voltage command Vdc. As for the high frequency applied voltage, the case where the basic unit is output once has been described. Considering the influence of the current detection precision and noise upon the detected current value, however, improvement of the position estimation precision can be expected by applying the basic unit of the high frequency voltage an arbitrary number of times (n times) repetitively and averaging a plurality of detected current values when executing the present invention. This averaging is a method which is effective to both the first embodiment and the second embodiment. Hereafter, an operation of applying the basic unit of the high frequency applied voltage a plurality of times in the first embodiment will be described.

Figure 26:
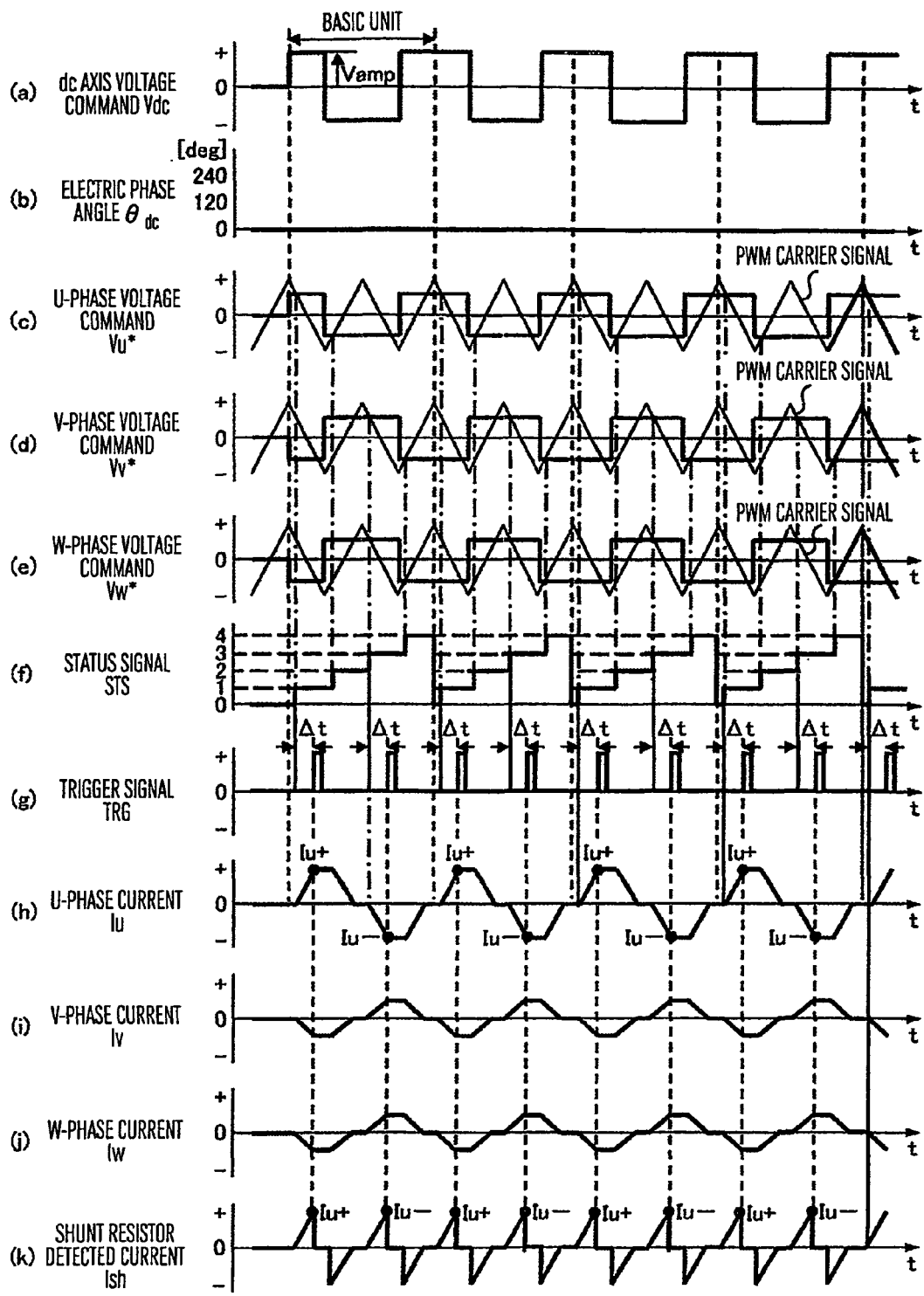
FIG. 26 is an operation waveform diagram in the case where a basic unit of high frequency applied voltage is repeated a plurality of times.

FIG. 26 shows relations between voltage commands and currents obtained when the basic unit of the high frequency applied voltage is applied a plurality of times. In the present invention, the electric phase angle θdc is switched to 0 degree, 120 degrees and 240 degrees successively. However, operation waveforms shown in FIG. 26 are waveforms in the case where the electric phase angle θdc=0.

As shown in (a) of FIG. 26, the basic unit of the high frequency applies voltage is output to the dc axis voltage command Vdc a plurality of times. Here, the basic unit of the high frequency applies voltage is output continuously without providing a voltage suspension time period which satisfies the relation Vdc=0. Transformation to the three-phase voltage commands Vu*, Vv* and Vw* respectively shown in (c), (d) and (e) of FIG. 26, and generation of the status signal STS and the trigger signal TRG are conducted by using the method described in the first embodiment.

In FIG. 26, (k) shows the detected current signal Ish which flows through the DC resistor 111. If the electric phase angle θdc=0, then the positive and negative current values Iu+ and Iu− of the U-phase appear in Ish repetitively. Therefore, a method of sampling Iu+ and Iu− the number of times of repetition is executed. Although not illustrated in FIG. 19, the basic unit of the high frequency applied voltage is output a plurality of times and Iv+ and Iv− are sampled the number of times of repetition, also when the electric phase angle θdc is 120 degrees. In the same way, the basic unit of the high frequency applied voltage is output a plurality of times and Iw+ and Iw− are sampled the number of times of repetition, also when θdc is 240 degrees.

An average value of current values obtained by conducting the sampling a plurality of times is computed by the averaging processing in the phase current value detection unit 113 shown in FIG. 17. For example, an averaged U-phase positive side current value Ius+ is output on the basis of data of Iu+ obtained by conducting sampling n times. Similar processing is conducted for Ius−, Ivs+, Ivs−, Iws+ and Iws− as well. As for effects obtained by averaging the detected current values and conducting processing, it can be mentioned that the position estimation error is decreased because the influence of noise contained in the detected current value can be decreased.

Figure 27:
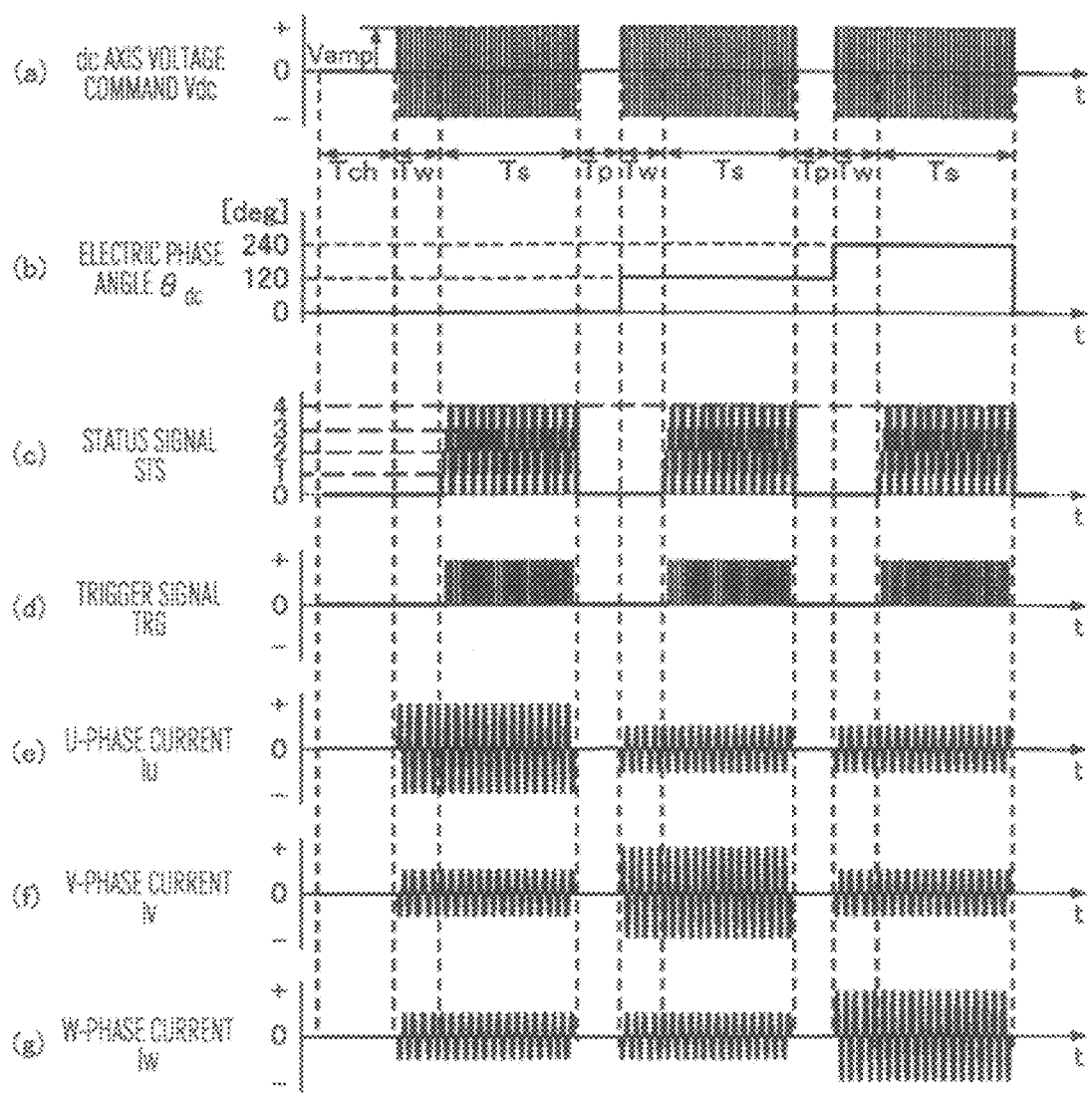
FIG. 27 is a diagram showing output signals and their operation waveforms which are suitable when actually using the present invention.

A way of giving voltage commands and a method of current detection which are favorable when using a method in the first embodiment and the second embodiment in the actual machine will now be described. FIG. 27 shows relations among a change of the voltage command, the trigger signal for current detection, and the motor current values. As shown in (a) of FIG. 27, the voltage command Vdc remains zero over Tch from the time when the control signal output supplied from the PWM signal controller 108 to the main circuit unit 109 has been started. After Tch has elapsed, the voltage command Vdc is switched to a square wave signal having voltage amplitude of Vamp. Then, Vdc is kept zero over a time period of Tp. Then, θdc is switched to 120 degrees and Vdc becomes a square wave signal described above. Then, Vdc is kept zero over a time period of Tp again. Finally, θdc is switched to 240 degrees and Vdc becomes a square wave signal described above.

The way of giving voltage commands and the method of current detection shown in FIG. 27 have the following three features: (1): a time period (capacitor initial charge time period Tch) over which lower arm switch elements in the main circuit unit 109 are turned on before applying the high frequency applied voltage is provided; (2): a time period (stationary waiting time period Tw) over which the current detection is not conducted although application of the high frequency voltage is started; and (3) a time period (pulse voltage suspension time period Tp) over which the voltage command Vdc is set to Vdc=0 when switching the electric phase angle θdc is provided. Hereafter, the features (1) to (3) will be described.

The capacitor initial charge time period Tch is a time period required when upper arm switch elements in the power converter are controlled by a gate drive circuit of bootstrap type. Over the time period Tch, the lower arm switch elements in the main circuit unit 109 are turned on to conduct the initial charging on a power supply capacitor in the bootstrap circuit. Owing to the initial charging, the upper arm switch elements in the main circuit unit 109 are controlled normally to turn on or off, and three-phase voltages corresponding to the voltage command can be output. By the way, the capacitor initial charge time period Tch should be started at time when the control signal which is output from the PWM signal controller 108 is switched from "all switch elements off" to the PWM signal. By the way, if the gate drive circuit is not the bootstrap type circuit, the time period Tch may be set to zero in length.

The stationary waiting time period Tw is a waiting time required since the high frequency voltage begins to be applied until observed current values settle down to the stationary state. During this time period, currents are not detected. The reason why the stationary waiting time period Tw is provided is that a predetermined time is required for the currents to settle down to the stationary state when generating the voltage command and outputting the three-phase voltage in the actual machine. Since current values settled down to the stationary state are observed by providing Tw, dispersion of the detected current values is suppressed and the position estimation precision can be improved. In order to prevent current detection during the stationary waiting time period Tw, the status signal STS and the trigger signal TRG are kept zero over the Tw time period.

The pulse voltage suspension time period Tp is a time period over which pulse voltage application is suspended when switching the electric phase angle θdc and changing over the applied voltage phase. Specifically, the voltage command Vdc=0 is given. If currents remain after the application of the high frequency voltage is suspended, its influence exercised when applying a pulse voltage to the next phase can be reduced by providing the pulse voltage suspension time period.

The current values Iu+, Iu−, Iv+, Iv−, Iw+ and Iw− to be used in the initial position estimation computation are detected during a current detection time period shown in FIG. 27. After the positive and negative currents of the three phases are detected, the averaging processing in the three-phase current value detection unit 113 and the magnetic pole position estimation unit 114 can calculate the estimated magnetic pole position θest in accordance with a procedure which is similar to that in the first embodiment. By the way, the way of giving voltage commands and the method of current detection shown in FIG. 27 can be applied to all embodiments.

By the way, each of the four time periods, i.e., the stationary waiting time period Tw, the pulse voltage suspension time period Tp, the DC bus current detection time period Ts, and the capacitor initial charging time Tch is set by taking a basic unit time of the high frequency applied voltage as one unit (a minimum unit).

According to the present embodiment, phase current detection at the time of current transaction immediately after application of the high frequency voltage can be avoided and the influence of the residual currents can be suppressed by providing the voltage suspension time period at the time of changeover of the voltage application phase. Therefore, the magnetic saturation characteristics can be detected stably and an accurate initial position estimation result can be obtained.

Figure 28:
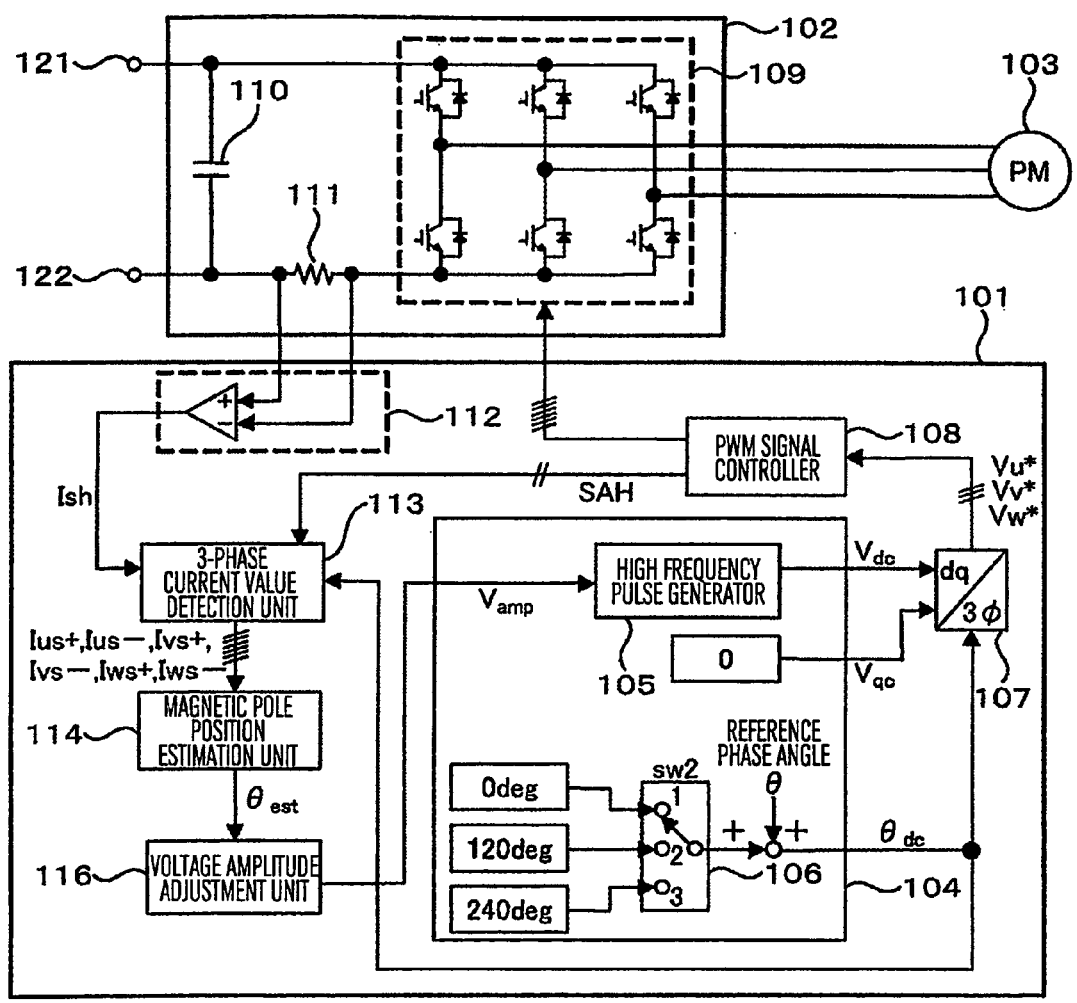
FIG. 28 is a general control block diagram in a third embodiment of the present invention.

A third embodiment of the present invention is a driving system including a unit for automatically adjusting the voltage amplitude Vamp of the square wave signal which is output from the high frequency pulse generator 105. FIG. 28 is a configuration diagram of the third embodiment. The present embodiment has a feature that a voltage amplitude adjustment unit 116 adjusts and optimizes the voltage amplitude Vamp of the square wave signal which is output from the high frequency pulse generator 105 by using the estimated magnetic pole position θest which is calculated by the magnetic pole position estimation unit 114.

Figure 29:
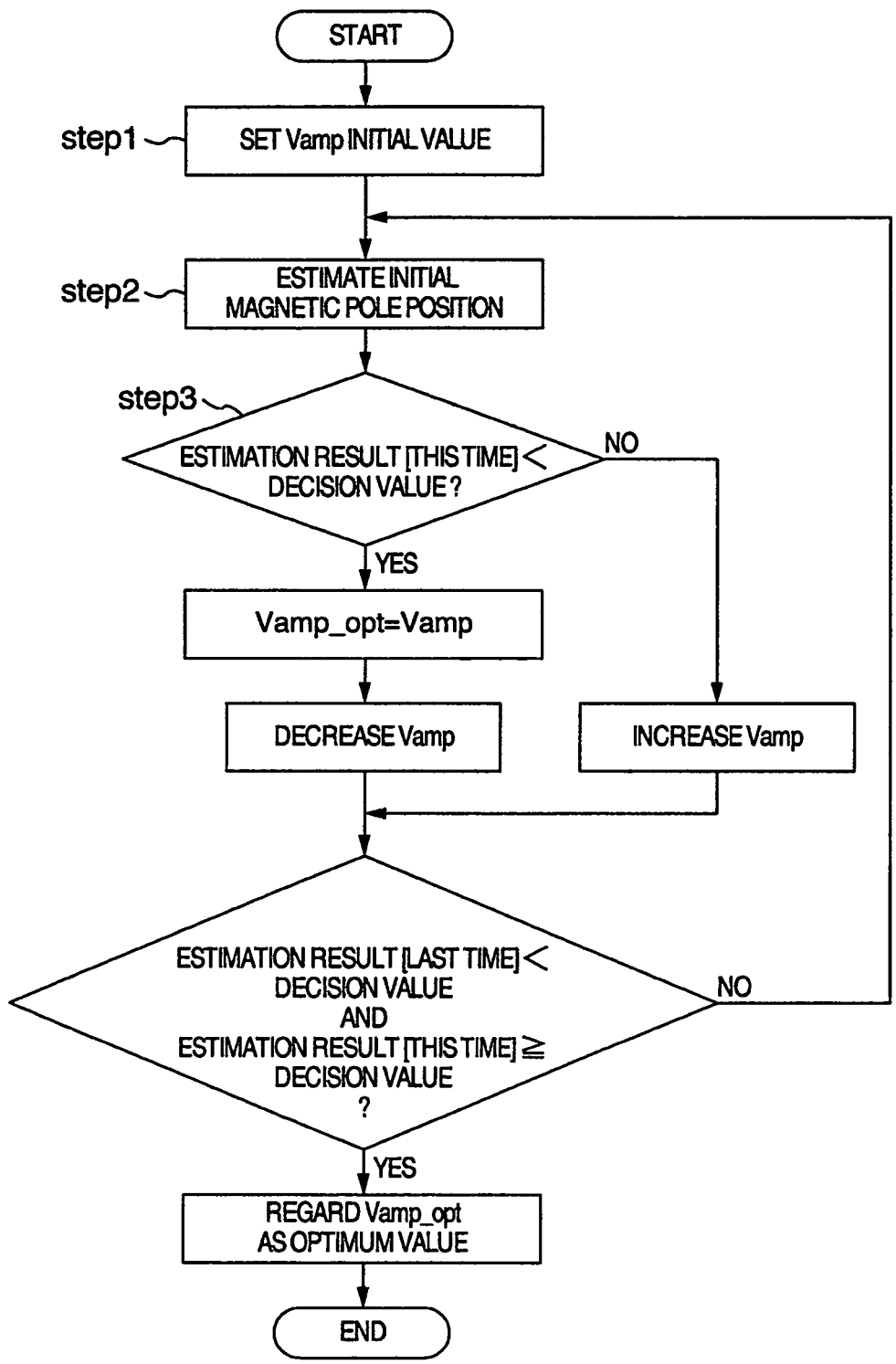
FIG. 29 is a flow chart diagram showing a voltage amplitude adjustment procedure in the third embodiment of the present invention.

A method for adjusting a voltage amplitude command signal Vamp which is output from the voltage amplitude adjustment unit 116 on the basis of the estimated magnetic pole position θest which is input to the voltage amplitude adjustment unit 116 will now be described specifically. FIG. 29 shows a procedure of the voltage amplitude adjustment in the present embodiment. First, at step 1, an initial value of the voltage amplitude command signal Vamp is set. Then, at step 2, initial position estimation is conducted by using a square wave signal having magnitude of Vamp an arbitrary number of times (N times), and values of the estimated magnetic pole position θest corresponding to N times are obtained. An evaluated value described later is calculated on the basis of the values of the estimated magnetic pole position θest corresponding to N times. Then, at step 3, a decision is made whether the evaluated value of the initial position estimation executed this time is less than a decision value. If the evaluated value of this time is less than the decision value, then Vamp executed this time is set as a voltage amplitude optimum value Vamp_opt and Vamp is decreased. If the evaluated value of this time is at least the decision value, then Vamp is increased. If at step 4 a condition that the estimation result of last time is less than the decision value and the estimation result of this time is at least the decision value is satisfied, then the voltage amplitude adjustment is finished and Vamp_opt is regarded as the optimum value of the voltage amplitude. If the condition is not satisfied, then the processing returns to the step 2 and a procedure which is similar to that described above is conducted again.

In the procedure shown in FIG. 29, operation is conducted to decrease the voltage amplitude Vamp of the applied high frequency voltage as far as possible as long as the evaluated value is less than the decision value. If Vamp is decreased gradually and consequently the evaluated value has become at least the decision value, the voltage amplitude adjustment end condition at the step 4 is satisfied. The setting value of the voltage amplitude Vamp of the last time becomes the optimum value of the applied voltage amplitude.

Details pf the operation of the voltage amplitude adjustment unit the evaluated value used in the adjustment will now be described specifically.

First, at step 1, an initial value of Vamp is set. As for the initial value of Vamp, a rated voltage or a sufficiently great voltage value at which the influence of the magnetic saturation appears remarkably is set.

Then, at step 2, a square wave signal having voltage amplitude Vamp is generated, and the initial position estimation is conducted an arbitrary number of times (N times) to calculate estimation results θest1 to θestN.

At step 3, an evaluated value of the initial position estimation is calculated by using the estimation results θest1 to θestN and decision processing for adjusting the voltage amplitude Vamp is conducted. As an example of the evaluated value, a technique using the degree of dispersion of the evaluation results θest will now be described.

A procedure for deriving the degree of dispersion of the evaluation results will now be described. First, a maximum value θest_max and a minimum value θest_min of the estimation results θest1 to θestN are found.

$$\begin{cases} \theta_{est\_max} = \text{MAX}\{\theta_{est1}, \theta_{est2}, \ldots, \theta_{estN}\} \\ \theta_{est\_min} = \text{MIN}\{\theta_{est1}, \theta_{est2}, \ldots, \theta_{estN}\} \end{cases} \quad (10)$$

Then, a deviation quantity θest_disp between the maximum value θest_max and a minimum value θest_min of the estimation results θest1 to θestN are found. The calculated θest_disp is used as an index (evaluated value) which represents the dispersion of the evaluation results.

$$\theta_{est\_disp} = \theta_{est\_max} - \theta_{est\_min} \quad (11)$$

If the amplitude Vamp of the applied high frequency voltage is small when conducting the initial position estimation in accordance with the present invention, then the current change difference caused by the magnetic saturation does not appear sufficiently in the detected positive and negative current values of the three phases as described earlier. As a result, a larger amount of current detection errors and noise are contained in the current values as compared with the current change difference having dependency upon the position. Supposing that noise contained in the detected current is stochastic, it is considered that the value of the estimation result θest of the initial position estimation changes every time and disperses. In accordance with the present invention, the estimation result θest_disp is compared with a predetermined decision value. If the estimation result dispersion θest_disp is greater than the decision value, i.e., if the dispersion of θest is great, it is appreciated that the difference of the current change caused by the magnetic saturation does not appear sufficiently in the detected positive and negative current values of the three phases, in the case of the voltage amplitude Vamp subjected to the initial position estimation.

The Vamp voltage amplitude adjustment at the step 3 is conducted in accordance with, for example, the following rules.

If the estimation result dispersion θest_disp obtained as a result of the initial position estimation executed this time is greater than a requested value of the estimation error, then the voltage amplitude Vamp is set to become twice.

If the estimation result dispersion θest_disp obtained as a result of the initial position estimation executed this time is equal to or less than the requested value of the estimation error, then the voltage amplitude Vamp is set as the voltage amplitude optimum value Vamp_opt and Vamp is set to become 0.9 times In the above-described rules, the decision value and the adjustment amplification factor of the Vamp may be set according to specifications of the driving motor and the requested initial position estimation precision.

At step 4, a decision is made whether the adjusted value of the voltage amplitude Vamp is an optimum set value. As for the decision method, Vamp is made small as far as possible under the condition that the estimation result dispersion θest_disp is within the requested range of the estimation error. A decision as to the end of the voltage amplitude adjustment at the step 4 is made in accordance with, for example, the following rules.

If the estimation result dispersion θest_disp of the initial position estimation executed last time is equal to or less than the requested value of the estimation error and the estimation result dispersion θest_disp of the initial position estimation executed this time is greater than the requested value of the estimation error, Vamp_opt is regarded as the optimum value of the voltage amplitude and the voltage amplitude adjustment is finished.

Otherwise, the processing returns to the step 2, and the above-described procedure is conducted repetitively.

Figure 30:
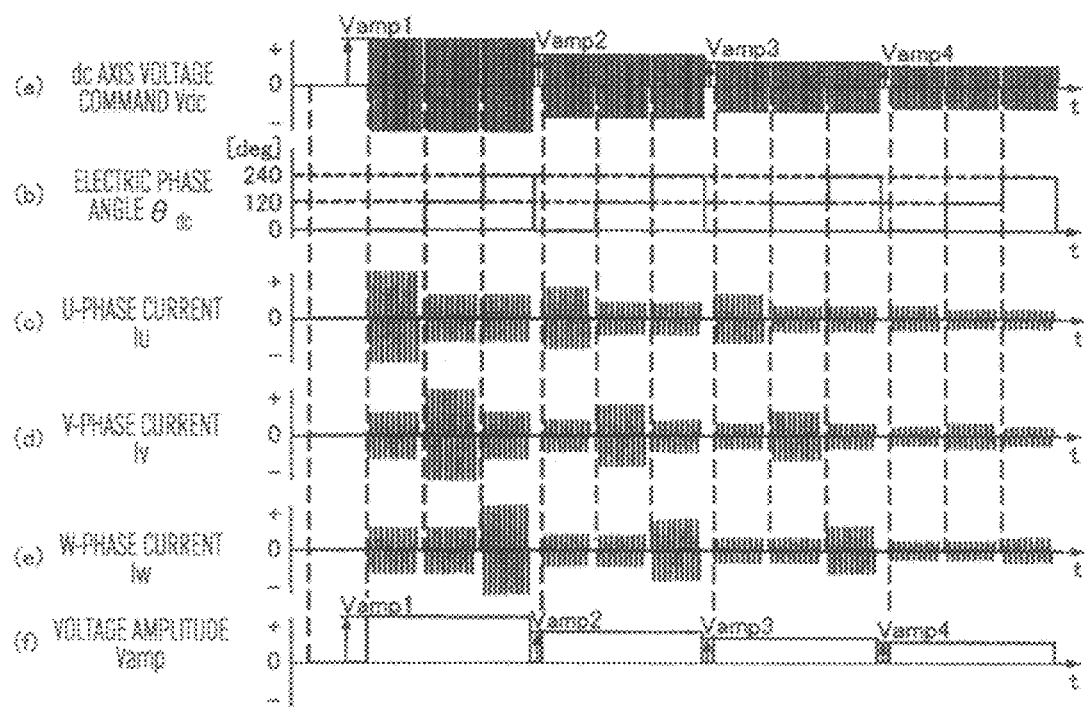
FIG. 30 shows an example of operation waveforms of a voltage amplitude adjustment unit in the third embodiment of the present invention.

FIG. 30 shows an example of operation waveforms of the voltage amplitude adjustment unit in the present embodiment. In the first application of the high frequency voltage, the voltage amplitude is set equal to Vamp1. As a result of conducting the voltage amplitude adjustment, the voltage amplitude is decreased to Vamp2, Vamp3 and Vamp4 successively. According to the present embodiment, it is possible to decrease the amplitude of the applied high frequency voltage as far as possible and conduct optimization to attain the minimum motor current required for the initial position estimation.

According to the present embodiment, optimization can be conducted to attain the minimum motor current required for the initial position estimation by providing the voltage amplitude adjustment unit. As a result, noise induced by generation of the pulsating current at the time of the initial position estimation can be reduced, and it is possible to make quieter. Even if a permanent synchronous motor having unknown specifications is connected as the permanent magnet synchronous motor 103, automatic adjustment can be conducted to attain an applied voltage amplitude value suitable for the initial position estimation by providing the voltage amplitude adjustment unit. In general-purpose inverters, there are many cases where a motor having unknown specifications is driven. By providing the voltage amplitude adjustment unit according to the present embodiment, however, it becomes unnecessary for the user of the inverter to previously measure the characteristics of the driven motor and adjustment time for parameter setting can be shortened.

By the way, the voltage amplitude adjustment unit 116 shown in FIG. 28 can be applied to the second embodiment shown in FIG. 23 as well in the same way.

In the first embodiment, the second embodiment and the third embodiment, the positive-negative alternating voltage is applied to the permanent magnet synchronous motor and estimation computation of the magnetic pole position is conducted by using the positive and negative detected current values of the pulsating current generated at that time. Even if the detected current values are replaced by current change quantities, however, the estimation computation of the magnetic pole position is possible in the same way as the foregoing description. As an example using the current change quantities, a fourth embodiment will now be described.

Figure 31:
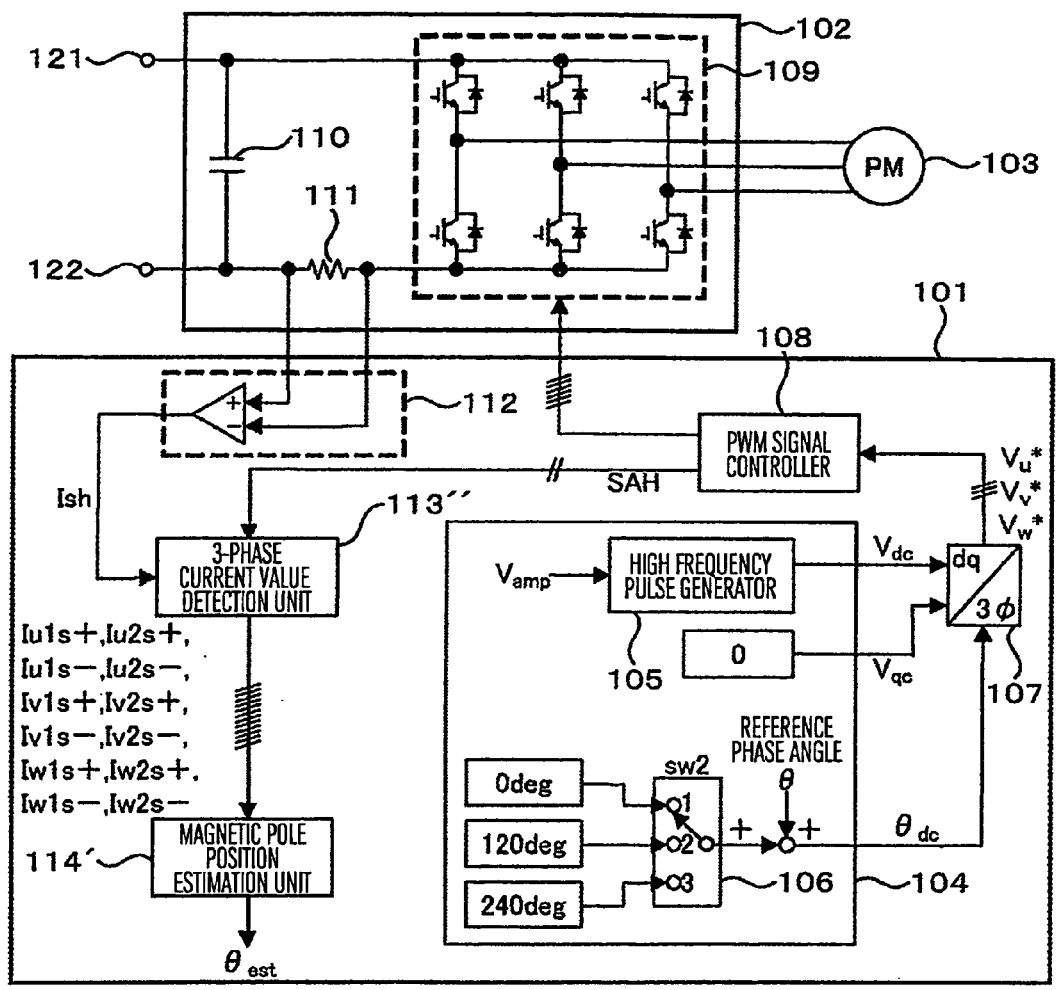
FIG. 31 is a general control block diagram in a fourth embodiment of the present invention.

FIG. 31 is a configuration diagram of a driving system of permanent magnet synchronous motor according to the fourth embodiment. Only parts of the configuration which are different as compared with the first embodiment shown in FIG. 1 will now be described.

A three-phase current value detection unit 113" shown in FIG. 31 outputs detected three-phase current values of respective phases at two points on the positive side and two points on the negative side by using the detected current signal Ish of the DC unit current, the current detection timing setting signal SAH which is output by the PWM signal controller 108, and the electric phase angle θdc. Specifically, values which are output by the three-phase current value detection unit 113" are U-phase positive-side detected values Iu1s+ and Iu2s+, U-phase negative-side detected values Iu1s− and Iu2s−, V-phase positive-side detected values Iv1s+ and Iv2s+, V-phase negative-side detected values Iv1s− and Iv2s−, W-phase positive-side detected values Iw1s+ and Iw2s+, and W-phase negative-side detected value Iw1s− and Iw2s−.

A magnetic pole position estimation unit 114' finds current change quantities of respective phase currents by using Iu1s+, Iu2s+, Iu1s−, Iu2s−, Iv1s+, Iv2s+, Iv1s−, Iv2s−, Iw1s+, Iw2s+, Iw1s− and Iw2s− which are output by the three-phase current value detection unit 113", calculates the estimated magnetic pole position of the permanent magnet synchronous motor 103, and outputs the estimated magnetic pole position as θest.

Figure 32:
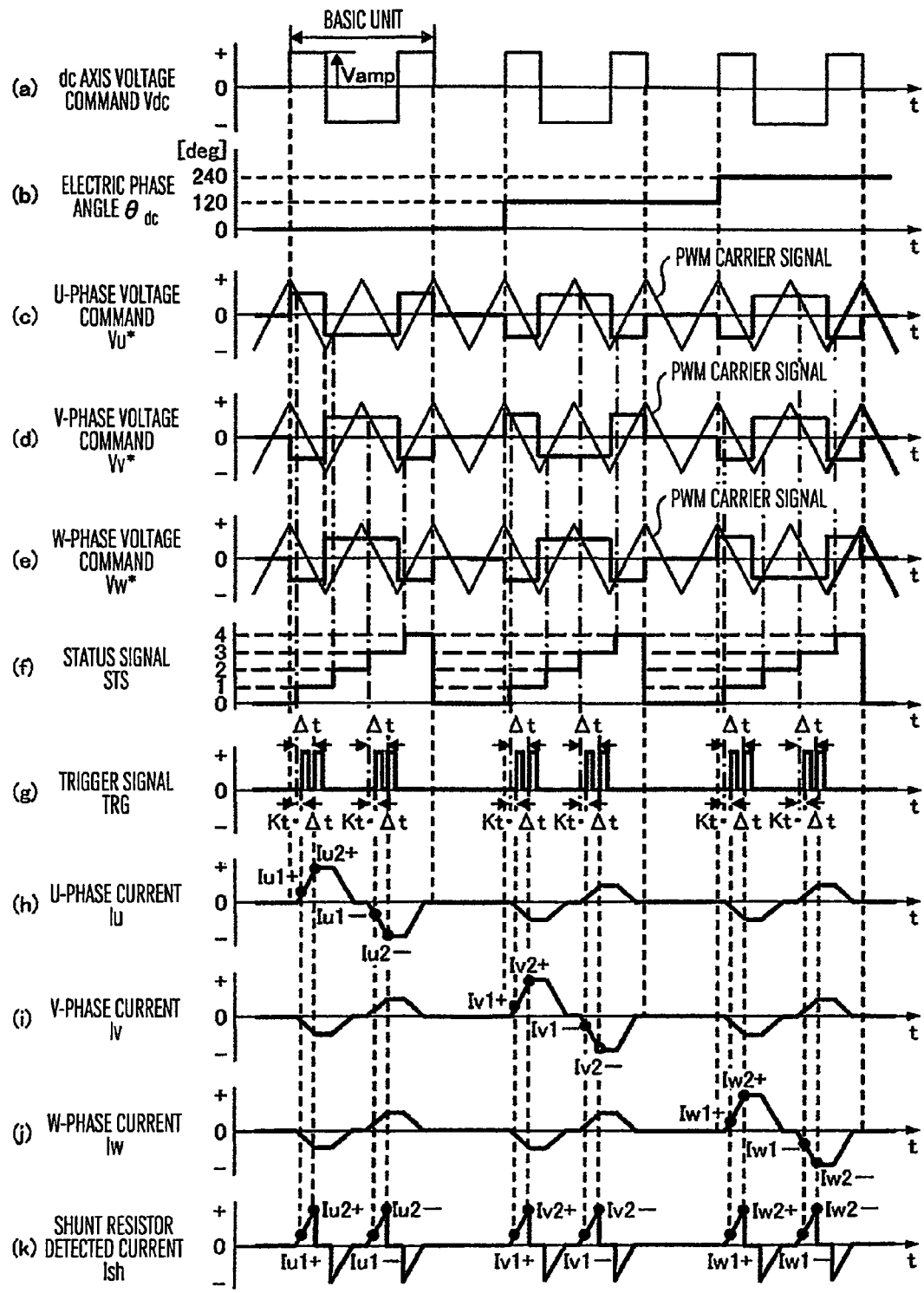
FIG. 32 shows an example of current detection timing in the fourth embodiment of the present invention.

FIG. 32 shows relations between application voltage commands and current waveforms in the case where the reference phase angle θ is set equal to θ=0 degree. Here, the dc axis voltage command Vdc and the electric phase angle θdc are changed in the same way as FIG. 16 which is used in the description of the first embodiment. The phase currents Iu, Iv and Iw also have the same waveforms as those shown in FIG. 16. The generation method of the status signal STS is also the same as that shown in FIG. 16. FIG. 32 differs only in the generation method of the trigger signal TRG from FIG. 16. In the fourth embodiment, the trigger signal TRG is generated at timing of Δt elapsing from transition of the value of the status signal STS from 0 to 1 or from 2 to 3 and at timing of elapse of Kt times Δt since transition of the value of the status signal STS from 0 to 1 or from 2 to 3. Here, Δt is a predetermined fixed value, and it is set to become shorter than a time period between transition of the value of the status signal STS from 0 to 1 (or from 2 to 3) and transition of the three-phase output voltages of the power converter to all positive state or all negative state. Kt is a positive fixed value of 1 or less.

Figure 33:
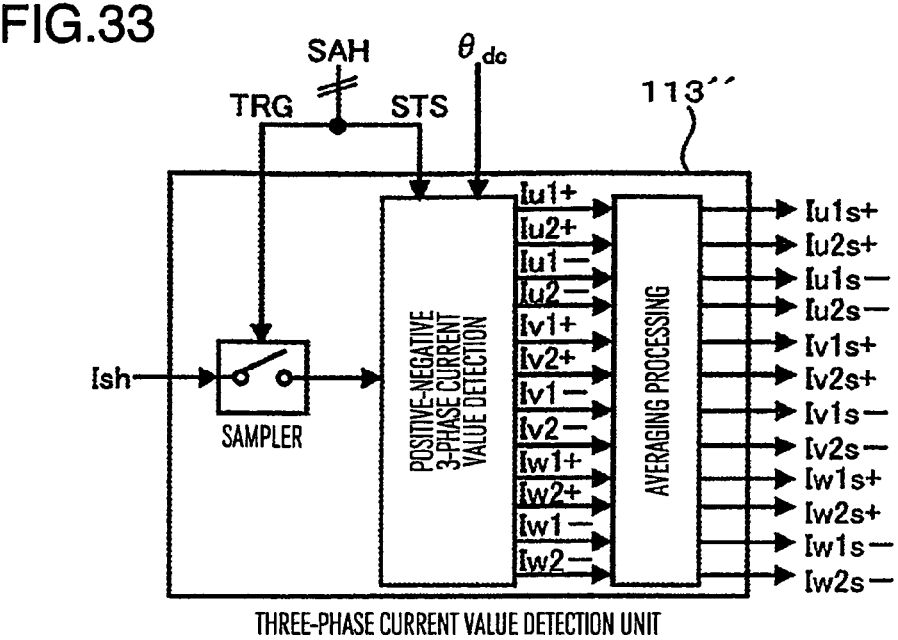
FIG. 33 is a function block diagram of a three-phase current detection unit in the fourth embodiment of the present invention.

An internal configuration of the three-phase current value detection unit 113" in the fourth embodiment is shown in FIG. 33. A sampler in the three-phase current value detection unit 113" samples the detected current Ish at time when the pulse of the trigger signal TRG has become the high level. The trigger signal TRG and sample timing of detected current values utilized for the magnetic pole position estimation are shown in FIG. 32. Black dots (●) in current waveforms shown in FIG. 32(h), (i), (j) and (k) indicate sampled current values. Sampled Ish values are distributed to positive and negative values of respective phase currents on the basis of information of the electric phase angle θdc and the status signal STS. The distribution is conducted according to the following rules.

A sample value of a first point of Ish obtained in response to a TRG signal which is generated when θdc=0 degree and STS=1 is regarded as a U-phase positive side current Iu1+.

A sample value of a second point of Ish obtained in response to a TRG signal which is generated when θdc=0 degree and STS=1 is regarded as a U-phase positive side current Iu2+.

A sample value of a first point of Ish obtained in response to a TRG signal which is generated when θdc=0 degree and STS=3 is regarded as a U-phase negative side current Iu1−.

A sample value of a second point of Ish obtained in response to a TRG signal which is generated when θdc=0 degree and STS=3 is regarded as a U-phase negative side current Iu2−.

A sample value of a first point of Ish obtained in response to a TRG signal which is generated when θdc=120 degrees and STS=1 is regarded as a V-phase positive side current Iv1+.

A sample value of a second point of Ish obtained in response to a TRG signal which is generated when θdc=120 degrees and STS=1 is regarded as a V-phase positive side current Iv2+.

A sample value of a first point of Ish obtained in response to a TRG signal which is generated when θdc=120 degrees and STS=3 is regarded as a V-phase negative side current Iv1−.

A sample value of a second point of Ish obtained in response to a TRG signal which is generated when θdc=120 degrees and STS=3 is regarded as a V-phase negative side current Iv2−.

A sample value of a first point of Ish obtained in response to a TRG signal which is generated when θdc=240 degrees and STS=1 is regarded as a W-phase positive side current Iw1+.

A sample value of a second point of Ish obtained in response to a TRG signal which is generated when θdc=240 degrees and STS=1 is regarded as a W-phase positive side current Iw2+.

A sample value of a first point of Ish obtained in response to a TRG signal which is generated when θdc=240 degrees and STS=3 is regarded as a W-phase negative side current Iw1−.

A sample value of a second point of Ish obtained in response to a TRG signal which is generated when θdc=240 degrees and STS=3 is regarded as a W-phase negative side current Iw2−.

As for the detected positive and negative current values of the three-phases, detected values over a plurality of times are averaged in the same way as the first embodiment. Specifically, averaging processing of the detected current values is conducted within the three-phase current value detection unit 113″ shown in FIG. 33. For example, an averaged U-phase positive side current value Iu1s+ is output on the basis of data Iu1+ sampled n times. The same is true of Iu2s+, Iu1s−, Iu2s−, Iv1s+, Iv2s+, Iv1s−, Iv2s−, Iw1s+, Iw2s+, Iw1s− and Iw2s− as well.

Figure 34:
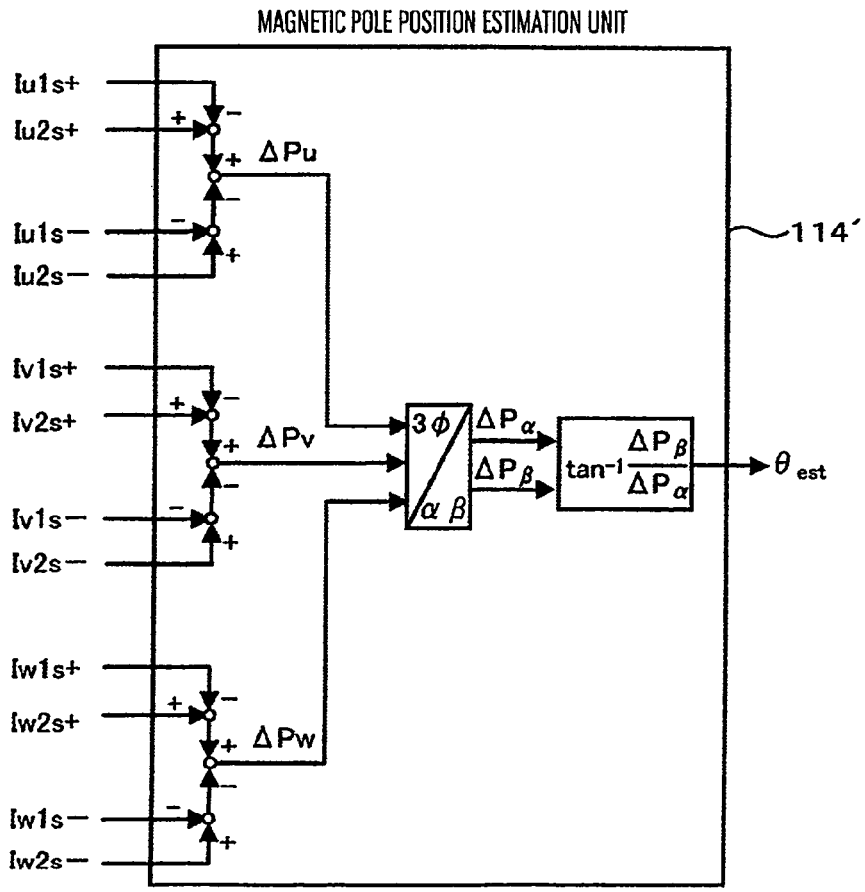
FIG. 34 is a function block diagram of a magnetic pole position estimation unit in the fourth embodiment of the present invention.

The magnetic pole position estimation unit 114′ shown in FIG. 31 will now be described. FIG. 34 shows an internal function block diagram of the magnetic pole position estimation unit 114′. The magnetic pole position estimation unit 114′ finds current change quantities on the basis of the positive and negative detected three-phase current values Iu1s+, Iu2s+, Iu1s−, Iu2s−, Iv1s+, Iv2s+, Iv1s−, Iv2s−, Iw1s+, Iw2s+, Iw1s− and Iw2s− which are output from the three-phase current value detection unit 113″. Then, the magnetic pole position estimation unit 114′ computes deviation quantities ΔPu, ΔPv and ΔPw of the current change quantities on the basis of the found current change quantities. Its computation equation is represented by Equation 12.

$$\begin{cases} \Delta P_u = |(I_{u2s+} - I_{u1s+})| - |(I_{u2s-} - I_{u1s-})| \\ \Delta P_v = |(I_{v2s+} - I_{v1s+})| - |(I_{v2s-} - I_{v1s-})| \\ \Delta P_w = |(I_{w2s+} - I_{w1s+})| - |(I_{w2s-} - I_{w1s-})| \end{cases} \quad (12)$$

As described in the first embodiment, the detected current values of respective phase currents become values depending upon the rotor magnetic pole position θd because of influence of the permanent magnet magnetic flux exerted on the magnetic saturation of the iron core. In the same way, the current change quantities of the respective phase currents also have characteristics depending upon the rotor magnetic pole position θd. If the rotor magnetic flux direction (d axis) coincides with the u axis (θd=0 degree) as described earlier with reference to FIG. 4 and a pulse voltage is applied to the positive side, then a current flows in a direction which strengthens the magnet magnetic flux and consequently the current change quantity on the positive side is maximized because of the above-described influence of the magnetic saturation of the iron core. On the other hand, if a pulse voltage is applied to the negative side, then a current flows in a direction which weakens the magnet magnetic flux and consequently the current change quantity on the negative side is minimized. If the rotor magnetic flux direction (d axis) is perpendicular to the u axis (θd=90 degrees) as described earlier with reference to FIG. 5, then the current change quantity obtained when a pulse voltage is applied to the positive side and the current change quantity obtained when a pulse voltage is applied to the negative side become equal to each other, because there is no influence of interlinkage magnetic flux of the permanent magnet in both cases.

The current change quantities of the respective phase currents have dependency upon the rotor position in this way. Therefore, values of the deviation quantities ΔPu, ΔPv and ΔPw of the current change quantities of the respective phases in Equation (12) become values depending upon the rotor magnetic pole position θd. As a result, the estimated magnetic pole position θest can be calculated from the deviation quantities ΔPu, ΔPv and ΔPw by using Equations (7) and (8) described in the first embodiment according to a similar procedure.

Figure 35:
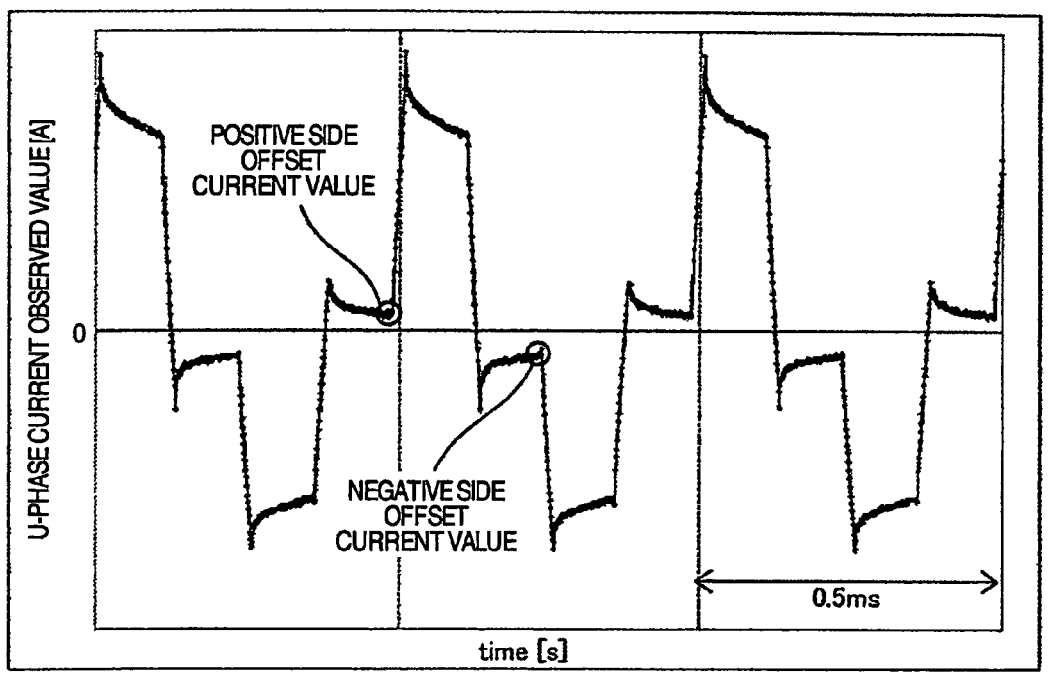
FIG. 35 shows an example of an actual current waveform obtained when a positive-negative alternating voltage is applied.

The present embodiment brings about an effect that the position estimation precision is improved in the case of a synchronous motor through which a pulsating current as shown in FIG. 35 flows. FIG. 35 shows an actually measured waveform of a pulsating current which is generated at the time of the initial position estimation in the present invention. In the first embodiment and the second embodiment described heretofore, the pulsating current has been handled as a waveform which swings from a state in which the current value is zero to the positive side and the negative side alternately, for example, as shown in (h), (i), (j) and (k) of FIG. 16. In some kinds of motors, however, the current value observed immediately before the current swings to the positive side and the negative side becomes non-zero as shown in FIG. 35. Here, the current value which is not zero is referred to as offset current value.

If the method of utilizing the current peak values of the positive side and the negative side in the initial position estimation computation as described in the first embodiment and the second embodiment is used in the case of the pulsating current shown in FIG. 35, then an error corresponding to the offset current value is brought about, resulting in a position estimation error. On the other hand, according to the present embodiment, the influence of the offset current value is canceled when calculating the current change quantity of the positive side of the pulsating current and the current change quantity of the negative side of the pulsating current, and consequently the position estimation precision can be improved.

In the present embodiment, an example in which current detection timing is determined on the basis of Δt and Kt has been described. However, there are also methods of generating the trigger signal TRG more simply. For example, it is supposed in the generation method of the trigger signal TRG shown in FIG. 32 that Δt is set equal to a time period between transition of the value of the status signal STS from 0 to 1 (or from 2 to 3) and transition of the three-phase output voltages of the power converter to the all positive state or all negative state and Kt is set equal to ½. In this case, detection of the DC bus current is conducted in the vicinity of timing between a wave crest and a wave bottom of the carrier signal in the PWM signal control unit and in the vicinity of the timing of transition of the output voltages of the three phases of the power converter to all positive state or all negative state. Therefore, it is also possible to determine the current detection timing on the basis of the relations between the carrier signal and the output voltages of the three phases. Since the sampled current is the same although the generation method of the trigger signal TRG is different, effects similar to those in the fourth embodiment are obtained.

Figure 36:
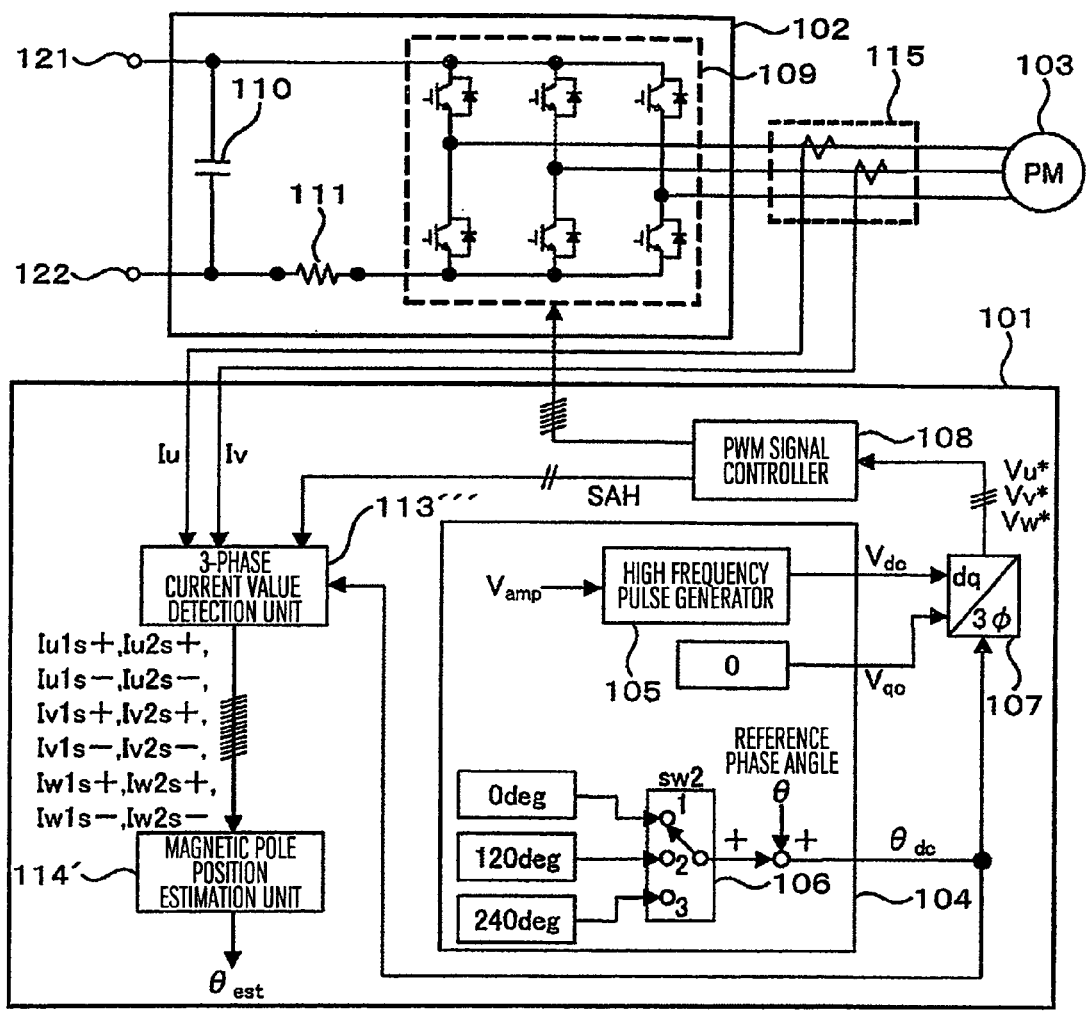
FIG. 36 is a general control block diagram in a fifth embodiment of the present invention.

A fifth embodiment of the present invention will now be described. The fifth embodiment is an example in which the estimation computation of the magnetic pole position is conducted by finding current change quantities on the basis of detected current values supplied from phase current sensors. FIG. 36 is a configuration diagram of a driving system of permanent magnet synchronous motor according to a fifth embodiment. Only parts of the configuration which are different as compared with the fourth embodiment shown in FIG. 31 will now be described. A phase current detection unit 115 shown in FIG. 36 detects currents Iu and Iv which flow respectively through the U-phase and the V-phase among the three-phase stator windings of the permanent magnet synchronous motor. A three-phase current value detection unit 113''' outputs detected three-phase current values of respective phases at two points on the positive side and two points on the negative side by using the detected currents Iu and Iv, the current detection timing setting signal SAH which is output by the PWM signal controller 108, and the electric phase angle θdc. Values which are output by the three-phase current value detection unit 113''' are U-phase positive-side detected values Iu1s+ and Iu2s+, U-phase negative-side detected values Iu1s− and Iu2s−, V-phase positive-side detected values Iv1s+ and Iv2s+, V-phase negative-side detected values Iv1s− and Iv2s−, W-phase positive-side detected values Iw1s+ and Iw2s+, and W-phase negative-side detected value Iw1s− and Iw2s−.

Figure 37:
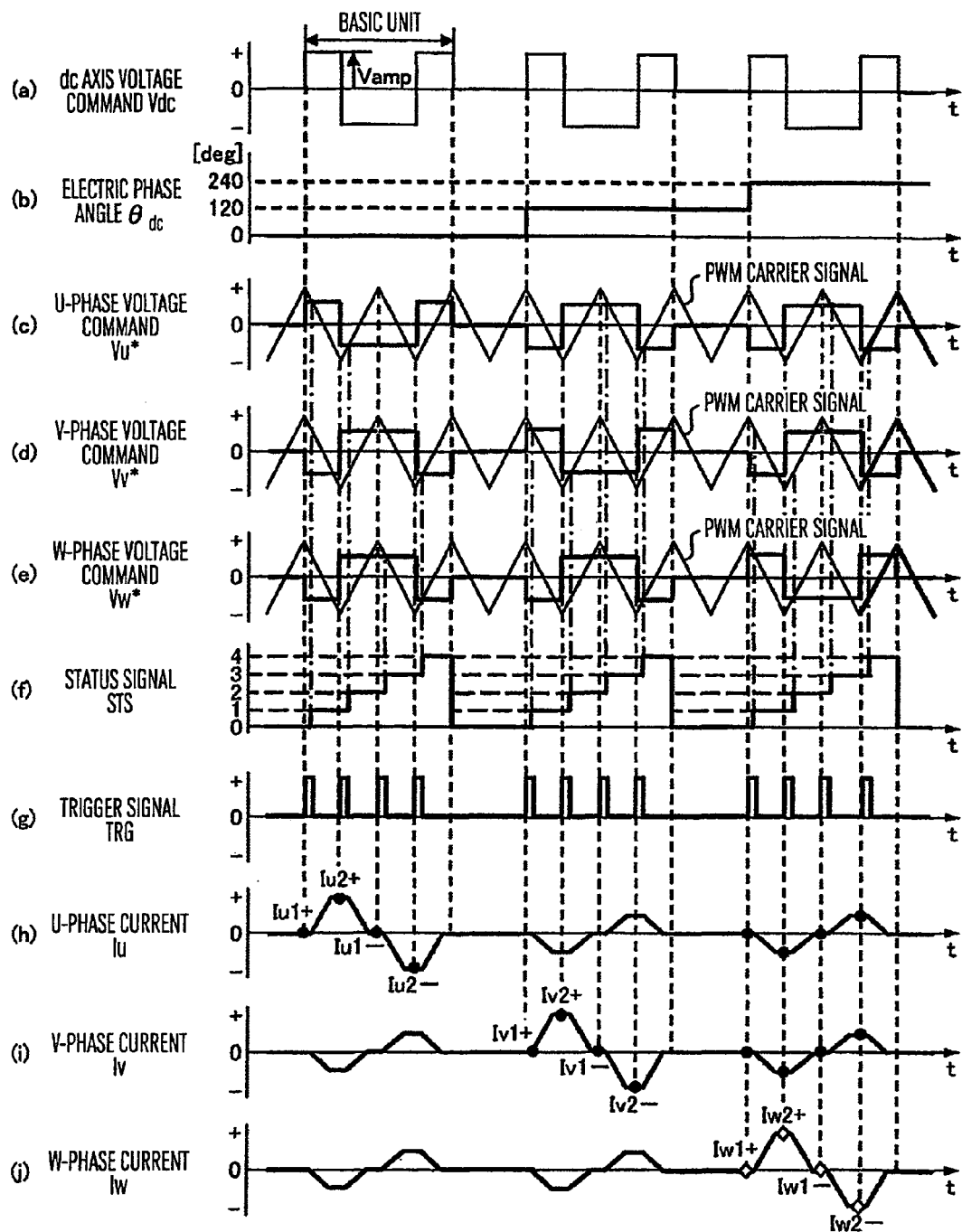
FIG. 37 shows an example of current detection timing in the fifth embodiment of the present invention.

FIG. 37 shows relations between output signals and output current waveforms in the case where the reference phase angle θ is set equal to θ=0 degree. Here, the dc axis voltage command Vdc and the electric phase angle θdc are changed in the same way as FIG. 16 which is used in the description of the first embodiment. The phase currents Iu, Iv and Iw also have the same waveforms as those shown in FIG. 16. The generation method of the status signal STS is also the same as that shown in FIG. 16. FIG. 37 differs only in the generation method of the trigger signal TRG from FIG. 16.

In the fifth embodiment, the trigger signal TRG is generated at timing of a wave crest or a wave bottom of a triangular wave PWM carrier signal at which application of a basic unit of high frequency applied voltage is started and at timing of the PWM carrier signal becoming a wave crest or wave bottom while the basic unit is being applied. FIG. 37 shows an example of operation waveforms in the case where application of the basic unit of the high frequency applied voltage begins at timing of a wave crest of the PWM carrier signal.

Phase currents are sampled at timing of the pulse output of the trigger signal TRG. Black dots (●) in current waveforms shown in (h) and (i) of FIG. 37 indicate sampled current values. In the present embodiment, the phase current detection unit 115 detects only the U-phase Iu and the V-phase current Iv. The W-phase current Iw which cannot be detected directly is calculated from the detected values of the U-phase and the V-phase in the same way as the second embodiment. Rhomb marks (◊) in the current waveform of Iw shown in (j) of FIG. 24 indicate calculated W-phase positive side detected value Iw+ and W-phase negative side detected value Iw−.

Figure 38:
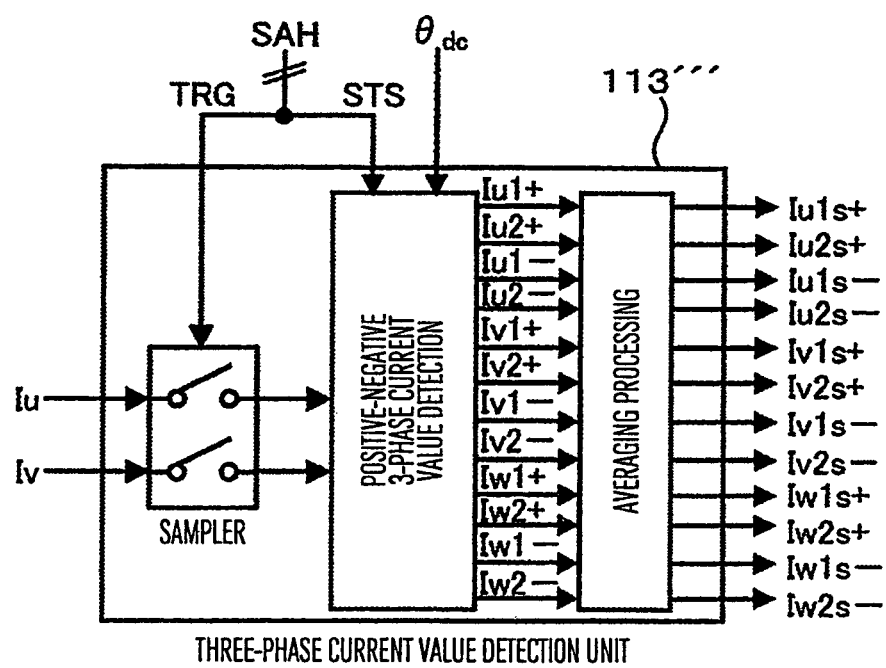
FIG. 38 is a function block diagram of a three-phase current detection unit in the fifth embodiment of the present invention.

An internal configuration of the three-phase current value detection unit 113''' in the fifth embodiment is shown in FIG. 38. The phase currents Iu and Iv are sampled at the above described timing, and sampled phase current values are distributed to positive and negative current values of respective phases on the basis of information of the electric phase angle θdc and the status signal STS. The distribution is conducted according to the following rules.

A sample value (●) of the U-phase current Iu obtained in response to a TRG signal which is generated when θdc=0 degree and STS=0 is regarded as a U-phase positive side current Iu1+.

A sample value (●) of the U-phase current Iu obtained in response to a TRG signal which is generated when θdc=0 degree and STS=1 is regarded as a U-phase positive side current Iu2+.

A sample value (●) of the U-phase current Iu obtained in response to a TRG signal which is generated when θdc=0 degree and STS=2 is regarded as a U-phase negative side current Iu1−.

A sample value (●) of the U-phase current Iu obtained in response to a TRG signal which is generated when θdc=0 degree and STS=3 is regarded as a U-phase negative side current Iu2−.

A sample value (●) of the V-phase current Iv obtained in response to a TRG signal which is generated when θdc=120 degrees and STS=0 is regarded as a V-phase positive side current Iv1+.

A sample value (●) of the V-phase current Iv obtained in response to a TRG signal which is generated when θdc=120 degrees and STS=1 is regarded as a V-phase positive side current Iv2+.

A sample value (●) of the V-phase current Iv obtained in response to a TRG signal which is generated when θdc=120 degrees and STS=2 is regarded as a V-phase negative side current Iv1−.

A sample value (●) of the V-phase current Iv obtained in response to a TRG signal which is generated when θdc=120 degrees and STS=3 is regarded as a V-phase negative side current Iv2−.

A W-phase current calculated from the sample values (●) of the U-phase current Iu and the V-phase current Iv obtained in response to a TRG signal which is generated when θdc=240 degrees and STS=0 is regarded as a W-phase positive side current Iw1+.

A W-phase current calculated from the sample values (●) of the U-phase current Iu and the V-phase current Iv obtained in response to a TRG signal which is generated when θdc=240 degrees and STS=1 is regarded as a W-phase positive side current Iw2+.

A W-phase current calculated from the sample values (●) of the U-phase current Iu and the V-phase current Iv obtained in response to a TRG signal which is generated when θdc=240 degrees and STS=2 is regarded as a W-phase negative side current Iw1−.

A W-phase current calculated from the sample values (●) of the U-phase current Iu and the V-phase current Iv obtained in response to a TRG signal which is generated when θdc=240 degrees and STS=3 is regarded as a W-phase negative side current Iw2−.

Processing of the detected positive and negative current values of the three-phases is conducted in the same way as the fourth embodiment. Specifically, averaging processing of the detected current values is conducted within the three-phase current detection unit 113''' and the estimated magnetic pole position θest is calculated in the magnetic pole position estimation unit 114' by using a procedure similar to that in the fourth embodiment.

In the description of the fifth embodiment, an example in which the phase current detection unit 115 detects currents of the U-phase and the V-phase has been described. In the drive of the three-phase motor, however, a phase current which cannot be detected directly can be calculated from detected current values of two phases as well known. Even if two other phases are detected, therefore, the estimated magnetic pole position can be found in the same way. Furthermore, even if the phase current detection unit 115 detects currents of the three phases, i.e., U-phase, V-phase and W-phase, the estimated magnetic pole position can be found in the same way in the present invention.

The fifth embodiment is based on the phase current detection. If a current is detected at timing of a wave crest (or a wave bottom) of the PWM carrier signal, therefore, a peak value of the phase current and a current value before the pulse voltage is applied are obtained. Unlike the fourth embodiment, therefore, it is not necessary to move the current detection timing forward or backward according to the amplitude of the voltage command. As compared with the fourth embodiment, therefore, the fifth embodiment has an advantage that the TRG signal can be generated simply. Furthermore, the phase current detection is not susceptible to the influence of high frequency components (ringing currents) of currents generated by switching in the power converter 102. Therefore, the precision of the estimated position value using the detected currents becomes high.

By the way, if currents of the U-phase and the V-phase are detected at current detection timing (at dot ●) described in the embodiment shown in FIG. 32, position estimation computation can be conducted in the fifth embodiment in accordance with a procedure similar to the above-described procedure.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A synchronous motor driving system including a synchronous motor, a PWM signal controller for conducting pulse width modulation on three-phase voltage command signals by using a carrier signal, and a power converter driven by a gate signal subjected to pulse width modulation, the synchronous motor driving system comprising:

command voltage generation means for generating three-phase voltage command signals to apply a high frequency voltage to the synchronous motor;

current detection means for detecting a current which flows through the synchronous motor when the high frequency voltage is applied to the synchronous motor; and magnetic pole position estimation means for estimating a magnetic pole position of the synchronous motor on the basis of a result of the current detection, the command voltage generation means generating the three-phase voltage command signals by conducting successive switching among a first applied voltage mode for applying a positive-negative alternating high frequency voltage having arbitrary voltage amplitude to an arbitrary phase θ, a second applied voltage mode for applying a high frequency voltage having similar amplitude to a phase shifted in electric angle from the phase θ by 120 degrees, and a third applied voltage mode for applying a high frequency voltage having similar amplitude to a phase shifted in electric angle from the phase θ by 240 degrees, the current detection means detecting positive side values and negative side values of a pulsating current generated by applying the high frequency voltage in the first, second and third applied voltage modes at a rate of one phase in each of the modes, and obtaining information of a positive side U-phase detected current value, a negative side U-phase detected current value, a positive side V-phase detected current value, a negative side V-phase detected current value, a positive side W-phase detected current value, and a negative side W-phase detected current value, and the magnetic pole position estimation means calculating an estimated magnetic pole position of the synchronous motor by using detected current values of respective phases of the positive side and detected current values of respective phases of the negative side.

2. The synchronous motor driving system according to claim 1, wherein the command voltage generation means regards a winding axis direction of an arbitrary phase in three-phase stator windings of the synchronous motor as a reference phase and regards the reference phase as the phase 8=0.

3. The synchronous motor driving system according to claim 1, wherein each of the three-phase voltage command signals generated by the command voltage generation means is formed by repeating a minimum pattern of applied voltage which has the carrier signal of the PWM signal controller corresponding to two periods as one unit, at least once.

4. The synchronous motor driving system according to claim 3, wherein the minimum pattern is formed by:

keeping a voltage command of at least one phase among the three-phase voltage commands at a positive voltage over a half period of the carrier signal and keeping voltage commands of remaining phases at a negative voltage, inverting all polarities of the three-phase voltage commands over one subsequent period of the carrier signal, and inverting all polarities of the three-phase voltage commands again over a subsequent half period of the carrier signal.

5. The synchronous motor driving system according to claim 1, wherein prior to canceling an all-phase off state of the gate signal and applying a high frequency voltage, the command voltage generation means outputs special three-phase voltage commands to provide a time period during which all lower arm switch elements of the power converter are turned on.

6. The synchronous motor driving system according to claim 1, wherein when switching the applied voltage modes successively, the command voltage generation means provides a time period during which all of the three-phase voltage commands are set to zero and application of the high frequency voltage is suspended.

7. The synchronous motor driving system according to claim 1, further comprising averaging processing means for conducting averaging processing on current values detected at at least one point in each of the first, second and third applied voltage modes, every detection point in each mode, wherein an estimated magnetic pole position of the synchronous motor is calculated by using a detected current average value of the positive side at every phase and every detection point and a detected current average value of the negative side at every phase and every detection point.

8. The synchronous motor driving system according to claim 7, wherein the detected current average value is calculated by using detected current values obtained when a predetermined time has elapsed since application of the high frequency voltage is started in the first, second and third applied voltage modes.

9. The synchronous motor driving system according to claim 1, wherein
the current detection means detects a DC bus current in the power converter.

10. The synchronous motor driving system according to claim 9, wherein
the current detection means detects a DC bus current at timing of elapse of a predetermined time $\Delta t$ since an output voltage of at least one phase has changed from a state in which all output voltages of the three phases of the power converter are positive or negative.

11. The synchronous motor driving system according to claim 9, wherein
the current detection means detects a DC bus current at timing of elapse of a predetermined time $\Delta t$ since an output voltage of at least one phase has changed from a state in which all output voltages of the three phases of the power converter are positive or negative and at timing of elapse of a predetermined time $Kt \times \Delta t$ (where Kt is a positive fixed value of 1 or less) since an output voltage of at least one phase has changed from a state in which all output voltages of the three phases of the power converter are positive or negative.

12. The synchronous motor driving system according to claim 9, wherein
the current detection means detects a DC bus current in vicinity of timing of transition to a state in which all output voltages of the three phases of the power converter are positive or negative.

13. The synchronous motor driving system according to claim 9, wherein
the current detection means detects a DC bus current in vicinity of timing of change of an output voltage of at least one phase from a state in which all output voltages of the three phases of the power converter are positive or negative and in vicinity of timing of transition to a state in which all output voltages of three phases of the power converter are positive or negative.

14. The synchronous motor driving system according to claim 1, wherein
the current detection means detects phase currents of at least two phases.

15. The synchronous motor driving system according to claim 14, wherein
the current detection means detects phase currents at timing of a wave crest or a wave bottom of the carrier signal in the PWM signal controller.

16. The synchronous motor driving system according to claim 14, wherein
the current detection means detects phase currents at timing of a wave crest and a wave bottom of the carrier signal in the PWM signal controller.

17. The synchronous motor driving system according to claim 1, wherein
the magnetic pole position estimation means finds a deviation quantity between a positive side detected current value and a negative side detected current value every phase, conducts coordinate transformation to two orthogonal axes on the obtained deviation quantities corresponding to the three phases, and calculates the estimated magnetic pole position of the synchronous motor from the quantities on the two orthogonal axes by using arctangent.

18. The synchronous motor driving system according to claim 1, wherein
the magnetic pole position estimation means finds a positive side current change quantity and a negative side current change quantity from the detected current values every phase, finds a deviation quantity between the positive side current change quantity and the negative side current change quantity every phase, conducts coordinate transformation to two orthogonal axes on the obtained deviation quantities corresponding to the three phases, and calculates the estimated magnetic pole position of the synchronous motor from the quantities on the two orthogonal axes by using arctangent.

19. The synchronous motor driving system according to claim 1, further comprising:
evaluation means for calculating a predetermined evaluated value on the basis of the magnetic pole position estimation result of the synchronous motor; and
means for varying amplitude of a high frequency voltage supplied to the synchronous motor,
wherein the amplitude of the high frequency voltage is increased or decreased for automatic adjustment on the basis of the evaluated value.

20. The synchronous motor driving system according to claim 19, wherein
the evaluated value is obtained by conducting the initial position estimation a number of times which is at least twice, calculating a maximum value and a minimum value on the basis of results of the initial position estimation conducted the number of times, and setting the evaluated value equal to a deviation quantity between the maximum value and the minimum value.

* * * * *